US012650697B2

(12) United States Patent
Suzuki et al.

(10) Patent No.: US 12,650,697 B2
(45) Date of Patent: Jun. 9, 2026

(54) AUTONOMOUS DRIVING CONTROL SYSTEM AND AUTONOMOUS DRIVING CONTROL METHOD

(71) Applicant: Integral Geometry Science Inc., Hyogo (JP)

(72) Inventors: Shogo Suzuki, Hyogo (JP); Yuki Mima, Hyogo (JP); Yutaro Nishimura, Hyogo (JP); Seiju Matsuda, Hyogo (JP); Kenjiro Kimura, Hyogo (JP); Noriaki Kimura, Hyogo (JP)

(73) Assignee: INTEGRAL GEOMETRY SCIENCE INC., Hyogo (JP)

( * ) Notice: Subject to any disclaimer, the term of this patent is extended or adjusted under 35 U.S.C. 154(b) by 65 days.

(21) Appl. No.: 18/862,678

(22) PCT Filed: Apr. 7, 2023

(86) PCT No.: PCT/JP2023/014379
§ 371 (c)(1),
(2) Date: Nov. 4, 2024

(87) PCT Pub. No.: WO2023/223706
PCT Pub. Date: Nov. 23, 2023

(65) Prior Publication Data
US 2025/0291348 A1 Sep. 18, 2025

(30) Foreign Application Priority Data

May 16, 2022 (JP) ................................. 2022-080439

(51) Int. Cl.
*G05D 1/244* (2024.01)
*G05D 1/248* (2024.01)
(Continued)

(52) U.S. Cl.
CPC ........... *G05D 1/2446* (2024.01); *G05D 1/248* (2024.01); *G05D 2107/13* (2024.01);
(Continued)

(58) Field of Classification Search
CPC .... G05D 1/0263; G05D 1/0259; G05D 1/243; G05D 1/2446; G05D 1/248; G05D 1/646;
(Continued)

(56) References Cited

U.S. PATENT DOCUMENTS 6,035,248 A * 3/2000 Nagai .................. G05D 1/0261
180/169
9,278,691 B1 3/2016 Zsombory et al.
(Continued)

FOREIGN PATENT DOCUMENTS

JP 63-49905 3/1988
JP 2001-134896 5/2001
(Continued)

OTHER PUBLICATIONS

International Search Report (ISR) issued on Jun. 13, 2023 in International (PCT) Application No. PCT/JP2023/014379.

*Primary Examiner* — Dalena Tran

(74) *Attorney, Agent, or Firm* — Wenderoth, Lind & Ponack, L.L.P.

(57) ABSTRACT

An autonomous driving control system for a vehicle that travels on a road provided with a marker that emits a steady magnetic field or a quasi-steady magnetic field includes: a magnetic sensor array that is equipped on the vehicle and senses magnetism; and an information processing circuit that generates an image showing a magnetic field in a region closer to the marker than the magnetic sensor array, according to a sensing result of the magnetism and a fundamental (Continued)

equation of the steady magnetic field and the quasi-steady magnetic field, and controls travel of the vehicle according to the image.

16 Claims, 33 Drawing Sheets

(51) Int. Cl.

| | | |
|---|---|---|
| G05D 107/13 | (2024.01) | |
| G05D 109/10 | (2024.01) | |
| G05D 111/10 | (2024.01) | |
| G05D 111/20 | (2024.01) | |
| G05D 111/30 | (2024.01) | |

(52) U.S. Cl.
CPC ...... *G05D 2109/10* (2024.01); *G05D 2111/17* (2024.01); *G05D 2111/20* (2024.01); *G05D 2111/30* (2024.01)

(58) Field of Classification Search
CPC .. G05D 2111/20; Y10S 428/90; B60W 60/00; G01R 33/0094; G01V 3/081; G08G 1/02
See application file for complete search history.

(56) References Cited

U.S. PATENT DOCUMENTS

| | | | | |
|---|---|---|---|---|
| 10,612,199 | B2 * | 4/2020 | Pratt | ........................ G01S 7/412 |
| 11,294,090 | B2 * | 4/2022 | Yamamoto | ........... G05D 1/0259 |
| 11,970,827 | B2 * | 4/2024 | Yamamoto | .............. B32B 27/08 |
| 12,276,709 | B2 * | 4/2025 | Choi | .................. G01R 33/0047 |
| 2010/0219819 | A1 | 9/2010 | Kimura et al. | |
| 2023/0259140 | A1 | 8/2023 | Yamamoto et al. | |

FOREIGN PATENT DOCUMENTS

| | | |
|---|---|---|
| JP | 2005-202478 | 7/2005 |
| WO | 62-233313 | 10/1987 |
| WO | 2008/123432 | 10/2008 |
| WO | 2021/261570 | 12/2021 |

* cited by examiner

Reconstruction image of

Travel direction

105

K     L     M

Magnetic field
direction

K
L
M     105

105

105

Electric conductor
closed circuit

105

Electric conductor
closed circuit

105

Electric conductor plate

105

Electric conductor plate

104

110

Front-rear
direction

Left-right
direction

Up-down
direction

104

110

Front-rear
direction

Left-right
direction

Up-down
direction

104

110

Front-rear
direction

Left-right
direction

Up-down
direction

104

110

Front-rear
direction

Left-right
direction

Up-down
direction

FIG. 39

Measurement
image

Magnetic field
distribution on
marker surface

Reconstruction
image

AUTONOMOUS DRIVING CONTROL SYSTEM AND AUTONOMOUS DRIVING CONTROL METHOD

TECHNICAL FIELD

The present disclosure relates to an autonomous driving control system and the like for a vehicle that travels on a road provided with markers.

BACKGROUND ART

Conventionally, autonomous driving of vehicles has been under research and development. The technique described in Patent Literature (PTL) 1 relates to such autonomous driving. More specifically, PTL 1 discloses a vehicle automatic traveling system that travels with automatic steering by detecting magnetic markers laid along the travel path of the vehicle.

CITATION LIST

Patent Literature

[PTL 1] Japanese Unexamined Patent Application Publication No. 2005-202478

SUMMARY OF INVENTION

Technical Problem

However, manholes, fallen objects, floor slabs buried under asphalt, reinforcing steel bars for concrete, bridge reinforcing bars, water pipes, culverts, and covers of utility tunnels may affect the magnetic field. Therefore, it may be difficult to identify a marker, and it may be difficult to control the travel of the vehicle.

In view of this, the present disclosure provides an autonomous driving control system and the like that can appropriately control the travel of the vehicle according to the markers.

Solution to Problem

An autonomous driving control system according to one aspect of the present disclosure is for a vehicle that travels on a road provided with a marker that emits a steady magnetic field or a quasi-steady magnetic field, and includes: a magnetic sensor array that is equipped on the vehicle and senses magnetism; and an information processing circuit that generates an image showing a magnetic field in a region closer to the marker than the magnetic sensor array, according to a sensing result of the magnetism and a fundamental equation of the steady magnetic field and the quasi-steady magnetic field, and controls travel of the vehicle according to the image.

These general or specific aspects may be implemented as a system, a device or apparatus, a method, an integrated circuit, a computer program, or a non-transitory computer-readable recording medium such a CD-ROM, or any combination thereof.

Advantageous Effects of Invention

According to one aspect of the present disclosure, it is possible to appropriately control the travel of the vehicle according to the markers.

BRIEF DESCRIPTION OF DRAWINGS

FIG. 7 is a conceptual diagram illustrating a first example of reconstruction according to an embodiment of the present disclosure.

FIG. 8 is a conceptual diagram illustrating a coordinate system for the first example of the reconstruction according to an embodiment of the present disclosure.

FIG. 39 is a conceptual diagram illustrating a magnetic shield according to an embodiment of the present disclosure.

DESCRIPTION OF EMBODIMENTS

Figure 1:
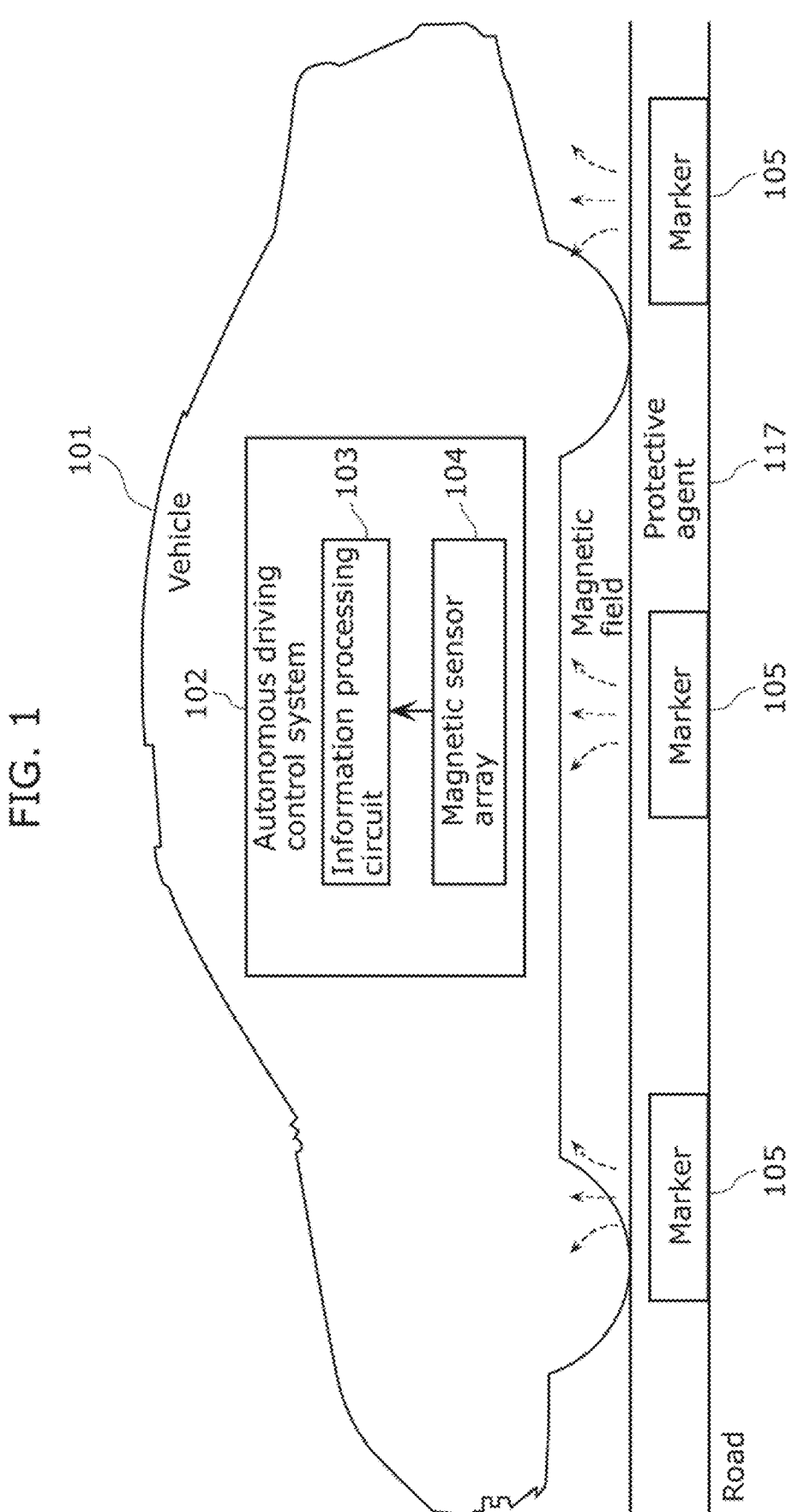
FIG. 1 is a conceptual diagram illustrating the configuration of an autonomous driving control system according to an embodiment of the present disclosure.

Generally, autonomous driving refers to the automation of driving tasks. Autonomous driving capabilities are classified into six levels, ranging from Level 0 to Level 5. Among these levels, Level 5 is also called full autonomous driving. In Level 5, all driving tasks to the destination are performed by the system. This means the driving tasks are not monitored by a human driver. Therefore, there is no room for error in Level 5 implementations.

Various sensing techniques for realizing autonomous driving are being researched and developed. More specifically, the use of cameras, LIDAR (Light Detection and Ranging), millimeter-wave radar, and ultrasonic sonar for autonomous driving is being researched and developed. For example, object detection and object recognition are performed by a camera. As a result, collision avoidance and white line recognition are performed. For example, the distance to objects is measured by LiDAR, millimeter-wave radar, and ultrasonic sonar, and collision avoidance is performed.

Furthermore, for example, the realization of autonomous driving using artificial intelligence (AI) composed of, for example, neural networks is being researched and developed. More specifically, in AI, driving tasks performed by drivers and corresponding images obtained from cameras are learned in advance. When the same image is obtained from the camera, the same driving task is reproduced by the AI. For example, white line recognition is carried out using a camera and AI, and the driving task is reproduced so that the vehicle moves along the white line. This enables the vehicle to move along the road.

For example, the use of markers such as magnetic markers for autonomous driving is also being researched and developed. More specifically, markers provided on the road are detected by a magnetic sensor equipped on a vehicle. The vehicle is controlled to move along the markers provided along the road.

For example, depending on weather conditions, it may be difficult to recognize white lines using a camera and AI. Therefore, there is a possibility of malfunction depending on weather conditions, and autonomous driving may be difficult. Thus, using markers that are less susceptible to weather conditions for autonomous driving is effective.

However, manholes, fallen objects, floor slabs buried under asphalt, reinforcing steel bars for concrete, bridge reinforcing bars, water pipes, culverts, and covers of utility tunnels may affect the magnetic field. Therefore, it may be difficult to identify the marker, and it may be difficult to control the travel of the vehicle.

For example, an autonomous driving control system according to one aspect of the present disclosure is for a vehicle that travels on a road provided with a marker that emits a steady magnetic field or a quasi-steady magnetic field, and includes: a magnetic sensor array that is equipped on the vehicle and senses magnetism; and an information processing circuit that generates an image showing a magnetic field in a region closer to the marker than the magnetic sensor array, according to a sensing result of the magnetism and a fundamental equation of the steady magnetic field and the quasi-steady magnetic field, and controls travel of the vehicle according to the image.

This enables the autonomous driving control system to control the travel of the vehicle according to an image showing the magnetic field in a region closer to the marker than the magnetic sensor array. This image is assumed to show the marker with high accuracy. It is therefore assumed that the marker can be appropriately identified. Therefore, the autonomous driving control system can appropriately control the travel of the vehicle according to the marker.

For example, the information processing circuit: obtains a speed of the vehicle; converts temporal changes in the sensing result into spatial changes according to the speed; and generates the image according to the fundamental equation and the sensing result in which the temporal changes have been converted into the spatial changes.

Accordingly, the autonomous driving control system can sufficiently obtain the spatial change of the magnetic field according to the temporal changes in sensing results and the speed of the vehicle. Therefore, the autonomous driving control system can adequately generate an image showing the magnetic field.

For example, the magnetic sensor array includes one or more two-dimensional magnetic sensor arrays arranged in a front-rear direction and a left-right direction of the vehicle.

Accordingly, the autonomous driving control system can sufficiently obtain the spatial change of the magnetic field with a two-dimensional magnetic sensor array. Therefore, the autonomous driving control system can adequately generate an image showing the magnetic field.

For example, the magnetic sensor array includes one or more one-dimensional magnetic sensor arrays arranged in a left-right direction of the vehicle.

This enables the autonomous driving control system to appropriately control the travel of the vehicle with few resources and at low cost.

For example, the magnetic sensor array senses the magnetism in one layer arranged in a front-rear direction and a left-right direction of the vehicle.

This enables the autonomous driving control system to sense magnetism in a simple manner and perform processing with a low computational load.

For example, the magnetic sensor array senses the magnetism in two layers arranged in a front-rear direction and a left-right direction of the vehicle.

This enables the autonomous driving control system to appropriately obtain the gradient of the magnetic field in the up-down direction and adequately generate an image showing the magnetic field.

For example, the information processing circuit generates the image according to Equation (5) to be described later which is in accordance with the sensing result and the fundamental equation, where: $H_i(x, y, z)$ is an i component in a magnetic field at a coordinate position (x, y, z); i is x, y, or z; z is a coordinate value in a z-direction from a top of the vehicle toward a bottom of the vehicle; x is a coordinate value in an x-direction orthogonal to the z-direction, y is a coordinate value in a y-direction orthogonal to the z-direction and the x-direction, $f(k_x, k_y)$ is a two-dimensional Fourier transform image of $H_i(x, y, 0)$ indicating the sensing result at (x, y, 0) which is a measurement plane; $k_x$ is a wavenumber with respect to x, and $k_y$ is a wavenumber with respect to y.

This enables the autonomous driving control system to adequately generate an image showing the magnetic field in a region closer to a marker than the magnetic sensor array, using the sensing result.

For example, the information processing circuit generates the image according to Equation (9) to be described later which is in accordance with the sensing result and the fundamental equation, where: $H_i(x, y, z)$ is an i component in a magnetic field at a coordinate position (x, y, z); i is x, y, or z; z is a coordinate value in a z-direction from a top of the vehicle toward a bottom of the vehicle; x is a coordinate value in an x-direction orthogonal to the z-direction, y is a coordinate value in a y-direction orthogonal to the z-direction and the x-direction, $f(k_x, k_y)$ is a two-dimensional Fourier transform image of $H_i(x, y, 0)$ indicating the sensing result at (x, y, 0) which is a measurement plane; $g(k_x, k_y)$ is a two-dimensional Fourier transform image of $\partial/\partial z H_i(x, y, z)|_{z=0}$ indicating a gradient in the z-direction of the sensing result at (x, y, 0) which is the measurement plane; $k_x$ is a wavenumber with respect to x, and $k_y$ is a wavenumber with respect to y.

This enables the autonomous driving control system to adequately generate an image showing the magnetic field in a region closer to a marker than the magnetic sensor array, using the sensing result and its gradient.

For example, the autonomous driving control system further includes: at least one of a camera, a LIDAR, a millimeter-wave radar, an ultrasonic sonar, or a GPS receiver equipped on the vehicle. The information processing circuit further controls the travel of the vehicle according to the at least one of the camera, the LiDAR, the millimeter-wave radar, the ultrasonic sonar, or the GPS receiver.

This enables the autonomous driving control system to control the travel of the vehicle according to various information obtained from a camera, a LIDAR, a millimeter-wave radar, an ultrasonic sonar, or a GPS receiver.

For example, the autonomous driving control system further includes the marker provided on the road.

This enables the autonomous driving control system to control the travel of the vehicle according to the marker included in the autonomous driving control system.

For example, the marker includes a plurality of markers provided on the road, and the plurality of markers emit steady magnetic fields or quasi-steady magnetic fields with a plurality of magnetic patterns for controlling the travel of the vehicle.

This enables the autonomous driving control system to control the travel of the vehicle according to a plurality of magnetic patterns.

For example, each of the plurality of magnetic patterns is a concentric magnetic pattern.

This enables the autonomous driving control system to inhibit the influence of the orientation of the vehicle in the identification of magnetic patterns.

For example, each of the plurality of magnetic patterns is a barcode-like magnetic pattern.

This enables the autonomous driving control system to control the travel of the vehicle according to a barcode that can simply indicate various information.

For example, each of the plurality of magnetic patterns is a two-dimensional code-like magnetic pattern.

This enables the autonomous driving control system to control the travel of the vehicle according to a two-dimensional code that can indicate a greater variety of information.

For example, the marker represents a code sequence, as an arrangement of a plurality of magnetic poles, for controlling the travel of the vehicle, the code sequence includes a code for error detection, and the information processing circuit: reads the code sequence according to the image; determines whether the code sequence read includes an error according to the code included in the code sequence read; and controls the travel of the vehicle in accordance with the code sequence read on condition that the code sequence read is determined to include no error.

This enables the autonomous driving control system to read a code sequence from the marker via an image indicating the magnetic field. The autonomous driving control system can determine whether the read-out code sequence includes an error according to the code for error detection. Accordingly, the autonomous driving control system can appropriately control the travel of the vehicle according to a highly reliable code sequence.

For example, the marker has a wire-like shape.

This enables the autonomous driving control system to control the travel of the vehicle along a wire-like shape.

For example, the marker is a magnetic material that is magnetic.

This enables the autonomous driving control system to control the travel of the vehicle using a simple marker.

For example, the marker is an electric conductor that is conductive.

This enables the autonomous driving control system to appropriately control the travel of the vehicle using an electric conductor as the marker.

For example, the autonomous driving control system further includes: an induction circuit that is equipped on the vehicle and induces a first magnetic field component. The marker emits the steady magnetic field or the quasi-steady magnetic field by inducing a second magnetic field component in response to the first magnetic field component.

This enables the autonomous driving control system to appropriately generate a magnetic field from the marker even when an electric conductor is used as the marker.

For example, a vehicle according to one aspect of the present disclosure includes the autonomous driving control system.

This enables the vehicle to control its travel according to an image showing the magnetic field in a region closer to the marker than the magnetic sensor array.

For example, an autonomous driving control method according to one aspect of the present disclosure is for a vehicle that travels on a road provided with a marker that emits a steady magnetic field or a quasi-steady magnetic field, and includes: sensing magnetism by a magnetic sensor array equipped on the vehicle; and generating an image showing a magnetic field in a region closer to the marker than the magnetic sensor array, according to a sensing result of the magnetism and a fundamental equation of the steady magnetic field and the quasi-steady magnetic field, and controlling travel of the vehicle according to the image.

This makes it possible to control the travel of the vehicle according to an image showing the magnetic field in a region closer to the marker than the magnetic sensor array. This image is assumed to show the marker with high accuracy. It is therefore assumed that the marker can be appropriately identified. It therefore becomes possible to appropriately control the travel of the vehicle according to the marker.

Hereinafter, embodiments will be described with reference to the drawings. Each of the following embodiments describes a general or specific example. The numerical values, shapes, materials, elements, the arrangement and connection of the elements, steps, the order of the steps etc., presented in the following embodiments are mere examples, and do not limit the scope of the claims.

The magnetic field components described in the present disclosure are the components that make up the magnetic field. The magnetic field components may be each of several magnetic fields superimposed on the overall magnetic field. In addition, the devices described in the present disclosure may include a plurality of elements arranged in a distributed manner.

Embodiment

FIG. 1 is a conceptual diagram illustrating the configuration of the autonomous driving control system according to the present embodiment. Vehicle 101 illustrated in FIG. 1 is a machine that travels on a road, and specifically is an automobile. Vehicle 101 can also be referred to as an autonomous driving vehicle.

Autonomous driving control system 102 is a system that controls the travel of vehicle 101. More specifically, autonomous driving control system 102 controls the travel of vehicle 101 in accordance with markers 105 provided on the road. Controlling travel of vehicle 101 by autonomous driving control system 102 includes, for example, controlling vehicle 101 to travel straight, turn left, turn right, stop, etc.

For example, a plurality of markers 105 are provided along the road. More specifically, a plurality of markers 105 are provided on the road surface and covered by protective agent 117. Autonomous driving control system 102 drives vehicle 101 along the plurality of markers 105 provided along the road.

Autonomous driving control system 102 includes information processing circuit 103 and magnetic sensor array 104.

Information processing circuit 103 is an electric circuit that performs information processing. Information processing circuit 103 generates an image showing the magnetic field in a region closer to marker 105 than magnetic sensor array 104, according to the sensing result of magnetism sensed by magnetic sensor array 104 and the fundamental equation of the steady magnetic field and the quasi-steady magnetic field.

A steady magnetic field is, for example, a static magnetic field that does not change over time. A quasi-steady magnetic field is, for example, a magnetic field in which temporal changes are smaller than a reference. More specifically, the quasi-steady magnetic field may be a magnetic field that changes at or below a reference frequency. This reference frequency may be 1 kHz, several hundred Hz, several tens of Hz, or several Hz.

The region closer to marker 105 than magnetic sensor array 104 may specifically be a region closer to the estimated position of marker 105 than magnetic sensor array 104, and may be defined as a position lower than magnetic sensor array 104. The region closer to marker 105 than magnetic sensor array 104 may be a region closer to the road surface than magnetic sensor array 104. The luminance of the image may correspond to the strength of the magnetic field. Information processing circuit 103 controls the travel of vehicle 101 in accordance with the generated image.

For example, information processing circuit 103 reads out information for controlling vehicle 101 from the generated image. More specifically, information processing circuit 103 reads out information such as travel straight, turn left, turn right, or stop. Information processing circuit 103 then controls the travel of vehicle 101 according to the read-out information.

Magnetic sensor array 104 is a device that senses magnetism. Magnetic sensor array 104 senses the magnetism of a magnetic field that includes a magnetic field component induced by marker 105 provided on the road. More specifically, for example, magnetic sensor array 104 includes a plurality of magnetic sensors and senses the magnetism of a magnetic field that includes a magnetic field component induced by marker 105 provided on the road with each magnetic sensor.

Marker 105 induces a magnetic field component. More specifically, marker 105 emits a steady magnetic field or a quasi-steady magnetic field. For example, a plurality of markers 105 are provided along the road. Marker 105 may be referred to as a magnetic marker.

For example, marker 105 may be a magnetic material (specifically a ferromagnetic material) that is magnetic such as a permanent magnet. Marker 105 embodied as a magnetic material that is magnetic may induce a magnetic field component. Marker 105 may be, for example, an electric conductor that is conductive, such as a ring or coil. Marker 105 embodied as an electric conductor that is conductive may induce a magnetic field component based on electromagnetic induction. This will be described in greater detail later.

For example, marker 105 may represent a code sequence, as an arrangement of a plurality of magnetic poles, for controlling travel of vehicle 101. Information processing circuit 103 may read out a code sequence in accordance with the generated image, and control the travel of vehicle 101 in accordance with the read-out code sequence.

For example, the code sequence represented by marker 105 may include a code for error detection. Information processing circuit 103 may determine whether the read-out code sequence includes an error according to the code for error detection. Information processing circuit 103 may control the travel of vehicle 101 in accordance with the read-out code sequence if it is determined that no error is included.

Information processing circuit 103 may ignore the read-out code sequence if it is determined that the read-out code sequence includes an error. In this case, information processing circuit 103 may output an alert indicating that the read-out code sequence includes an error. Alternatively, in this case, information processing circuit 103 may correct the error and control the travel of vehicle 101 in accordance with the error-corrected code sequence.

Protective agent 117 covers marker 105 and forms a layer for protecting marker 105. A protective film containing a resin or the like may be used as protective agent 117. A layer of protective agent 117 may be formed by applying a protective coating to the plurality of markers 105 and the road surface.

Figure 2:
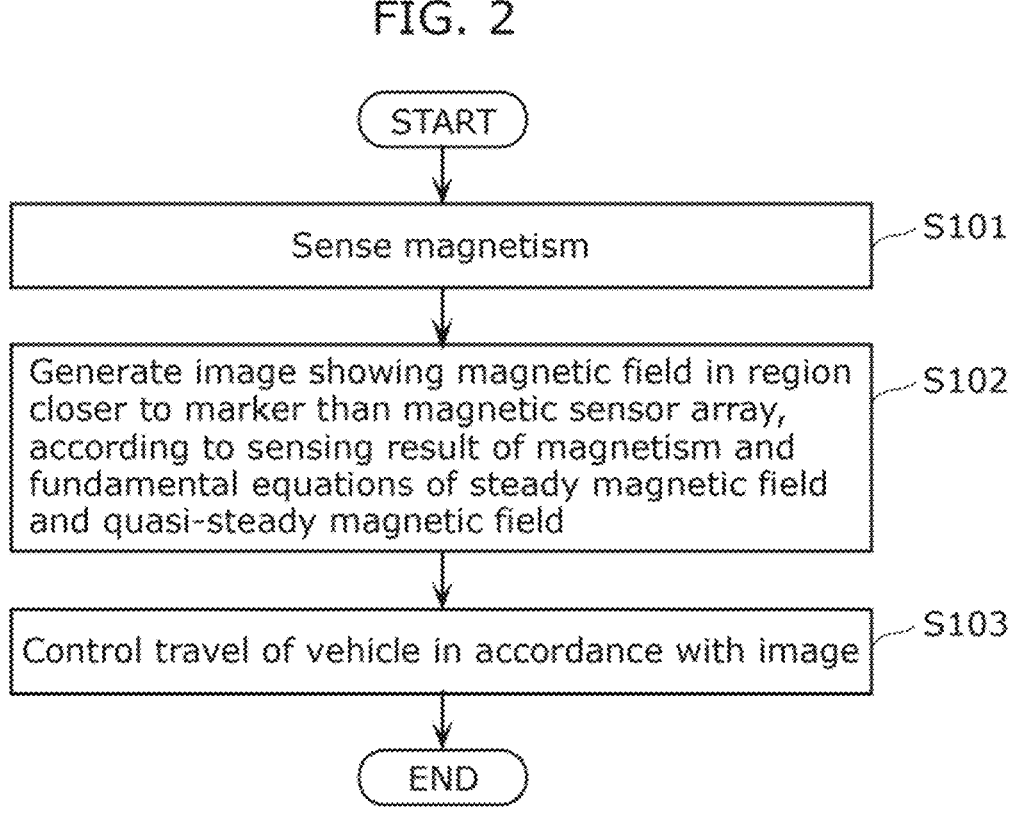
FIG. 2 is a flowchart illustrating operations performed by an autonomous driving control system according to an embodiment of the present disclosure.

FIG. 2 is a flowchart illustrating operations performed by autonomous driving control system 102 illustrated in FIG. 1. Autonomous driving control system 102 performs the operations illustrated in FIG. 2.

First, magnetic sensor array 104 of autonomous driving control system 102 senses magnetism (S101). Next, information processing circuit 103 of autonomous driving control system 102 generates an image showing the magnetic field in a region closer to marker 105 than magnetic sensor array 104, according to the sensing result of magnetism and the fundamental equation of the steady magnetic field and the quasi-steady magnetic field (S102). Information processing circuit 103 controls the travel of vehicle 101 in accordance with the generated image (S103).

Figure 3:
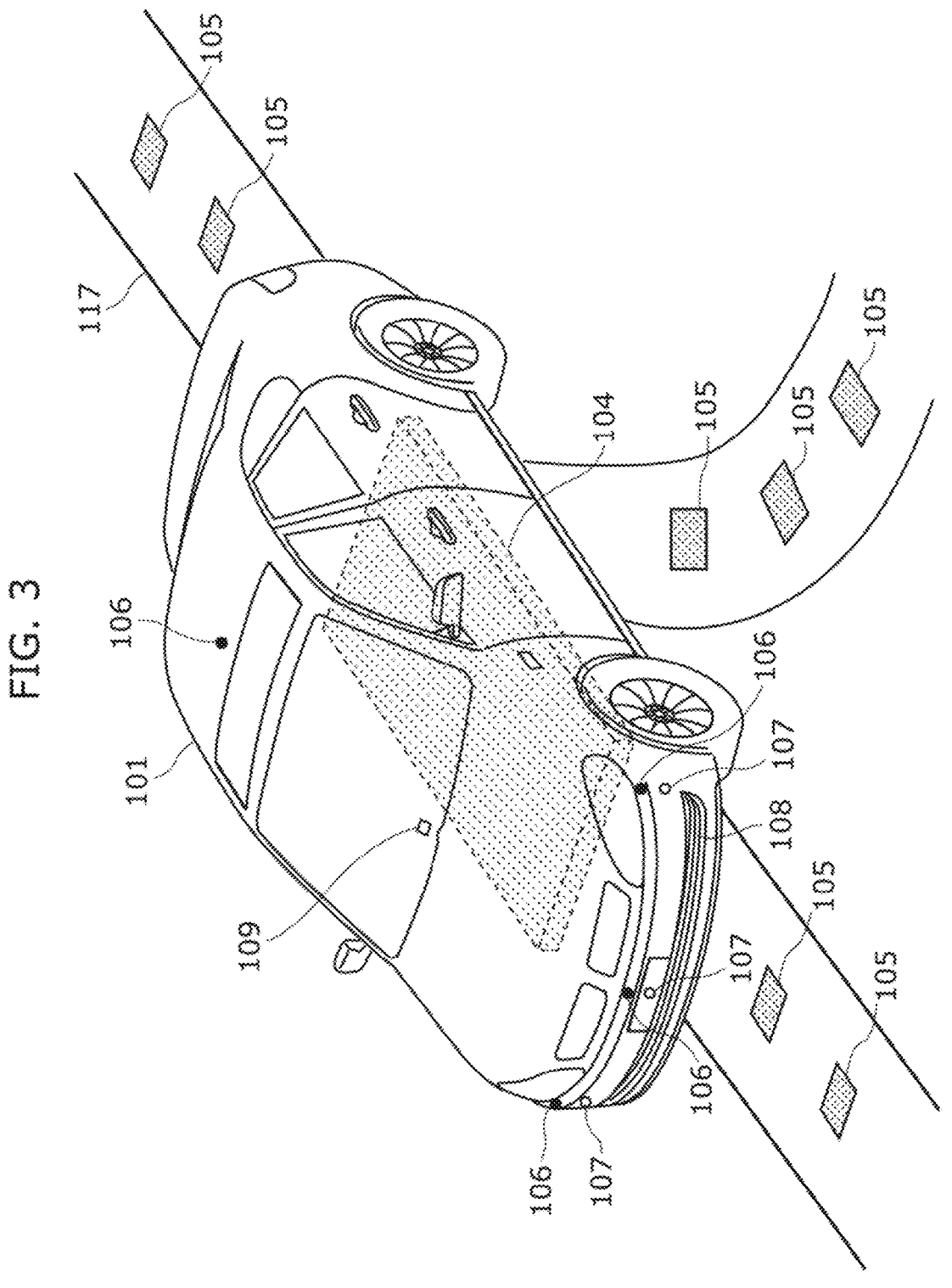
FIG. 3 is a perspective view of a vehicle according to an embodiment of the present disclosure.

FIG. 3 is perspective view of vehicle 101 illustrated in FIG. 1. As illustrated in FIG. 3, vehicle 101 is controlled to travel along a plurality of markers 105 covered by protective agent 117. Magnetic sensor array 104 equipped on vehicle 101 is disposed at the lower portion of vehicle 101.

As illustrated in FIG. 3, at least one of one or more cameras 106, one or more LiDARs 107, one or more wave sensors 108, and global positioning system (GPS) receiver 109 may be equipped on vehicle 101. Here, wave sensor 108 may be a millimeter wave radar, an ultrasonic sonar, or a combination thereof.

Information processing circuit 103 may perform collision avoidance by controlling the traveling of vehicle 101 according to information obtained from the one or more cameras 106, the one or more LiDARs 107, and the one or more wave sensors 108. In doing so, information processing circuit 103 may perform collision avoidance by performing object detection and object recognition using a neural network.

Stated differently, control for causing vehicle 101 to travel along a road using markers 105 and control for performing collision avoidance using the one or more cameras 106, the one or more LiDARs 107, and the one or more wave sensors 108 may be combined. Furthermore, information processing circuit 103 may obtain position information of vehicle 101 from GPS receiver 109 and control the travel of vehicle 101 according to the position information.

Autonomous driving control system 102 may include at least one of: the one or more cameras 106; the one or more LiDARs 107; the one or more wave sensors 108; or GPS receiver 109.

Figure 4:
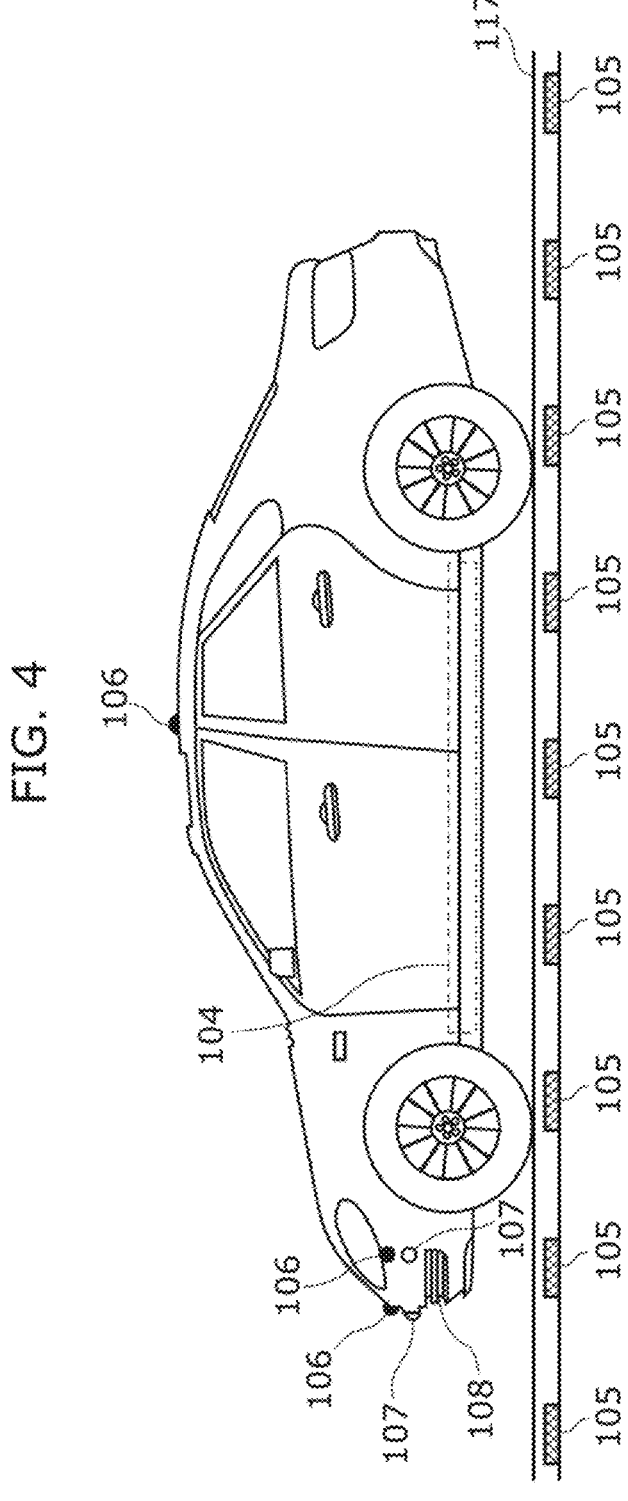
FIG. 4 is a side view of a vehicle according to an embodiment of the present disclosure.

FIG. 4 is side view of vehicle 101 illustrated in FIG. 1. As illustrated in FIG. 4, magnetic sensor array 104 is disposed at the lower portion of vehicle 101. Magnetic sensor array 104 senses the magnetism of a magnetic field that includes a magnetic field component induced by marker 105.

Figure 5:
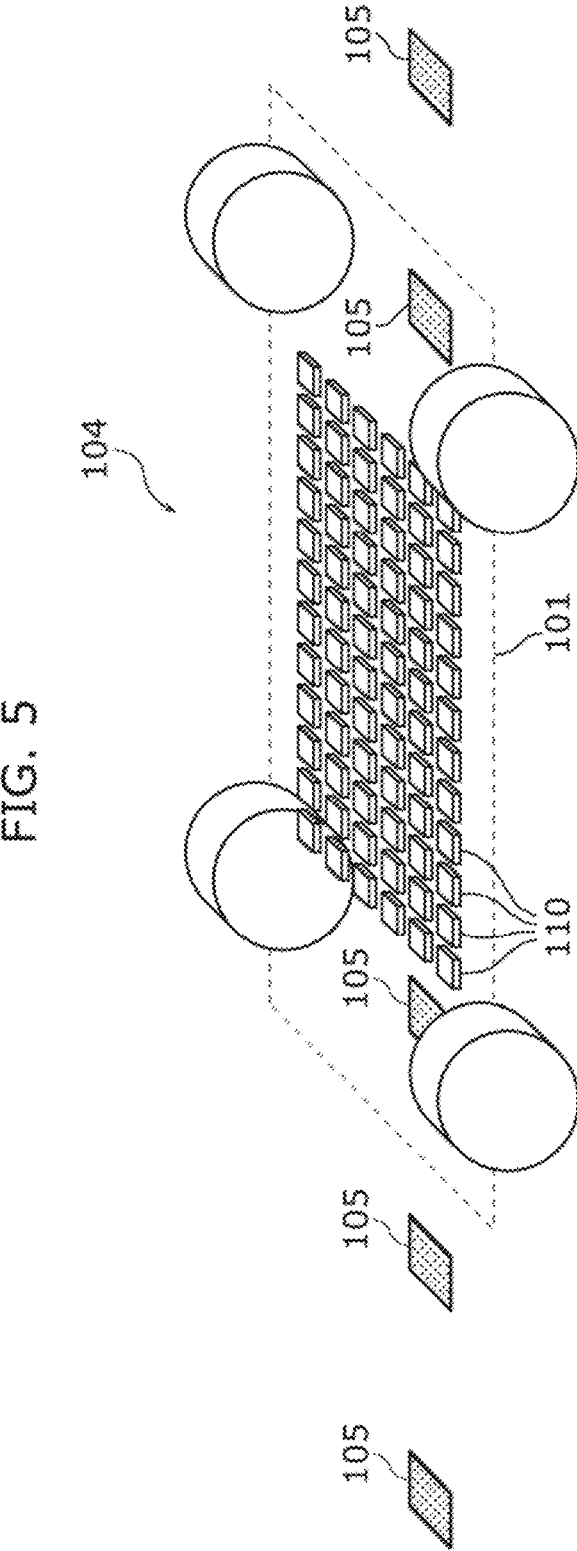
FIG. 5 is a conceptual diagram illustrating a first example of a magnetic sensor array according to an embodiment of the present disclosure.

FIG. 5 is a conceptual diagram illustrating a first example of magnetic sensor array 104 illustrated in FIG. 1. In this example, magnetic sensor array 104 is a two-dimensional magnetic sensor array arranged in the front-rear direction and the left-right direction of vehicle 101. Stated differently, magnetic sensor array 104 includes a plurality of magnetic sensors 110 arranged in the front-rear direction and the left-right direction of vehicle 101.

Figure 6:
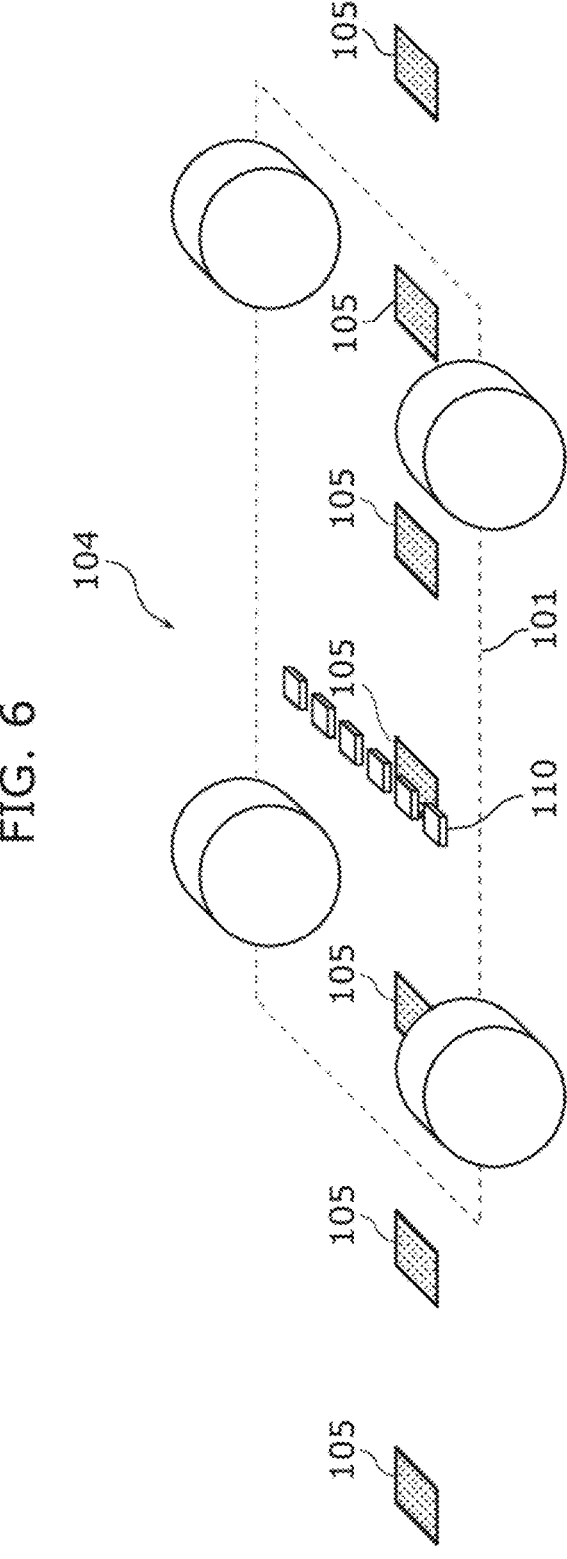
FIG. 6 is a conceptual diagram illustrating a second example of a magnetic sensor array according to an embodiment of the present disclosure.

FIG. 6 is a conceptual diagram illustrating a second example of magnetic sensor array 104 illustrated in FIG. 1. In this example, magnetic sensor array 104 is a one-dimensional magnetic sensor array arranged in the left-right direction of vehicle 101. Stated differently, magnetic sensor array 104 includes a plurality of magnetic sensors 110 arranged in the left-right direction of vehicle 101.

Figures 7, 8:
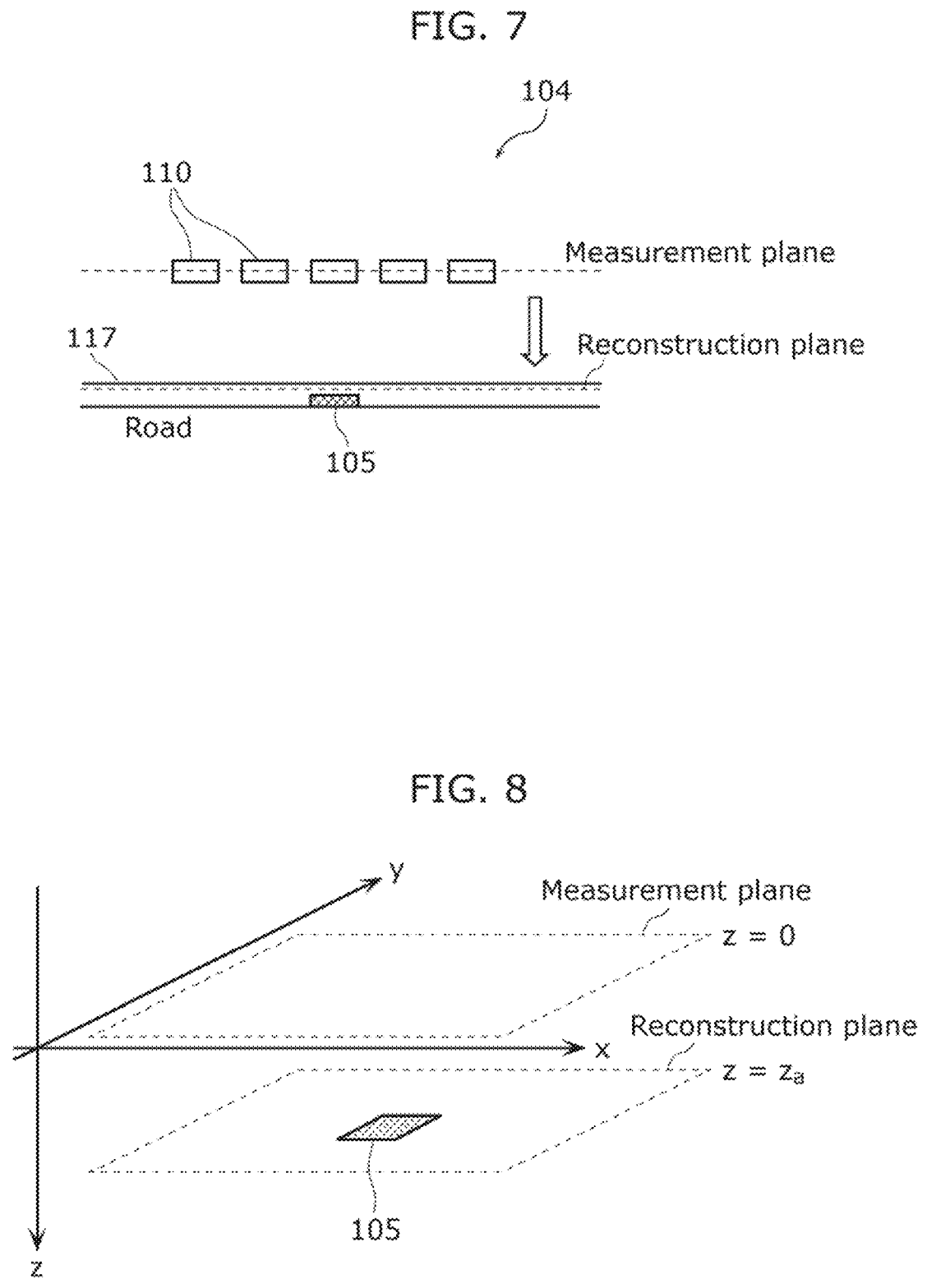

FIG. 7 is a conceptual diagram illustrating a first example of the reconstruction according to the present embodiment. For example, in the example of FIG. 6, by vehicle 101 traveling, magnetic sensor array 104, which is a one-dimensional magnetic sensor array, can scan a two-dimensional measurement plane above marker 105. This makes it possible to obtain a sensing result of magnetism on a two-dimensional measurement plane, that is, a two-dimensional sensing result.

For example, information processing circuit 103 obtains the speed of vehicle 101 from a speedometer or the like of vehicle 101, and converts the temporal changes in the sensing results in magnetic sensor array 104 into spatial changes according to the speed of vehicle 101. More specifically, the higher the speed of vehicle 101 is, the wider the range over which the temporal changes in the sensing results in magnetic sensor array 104 may be converted into spatial changes. This makes it possible to appropriately obtain a two-dimensional sensing result.

The operations described above may also be applied to the example in FIG. 5. More specifically, in magnetic sensor array 104, which is s a two-dimensional magnetic sensor a array, one-dimensional magnetic sensor array can be considered to exist for each row in the left-right direction. Therefore, according to the above operations, a two-dimensional sensing result is obtained for each row in the left-right direction. This makes it possible to obtain a plurality of two-dimensional sensing results, one for each of the plurality of rows in the left-right direction.

A single two-dimensional sensing result obtained by combining the plurality of two-dimensional sensing results may be used in subsequent processing, or each of the plurality of two-dimensional sensing results may be used in subsequent processing.

Information processing circuit 103 generates an image showing the magnetic field in a reconstruction plane closer to marker 105 than the measurement plane, according to the sensing result of magnetism in the measurement plane and the fundamental equation of the steady magnetic field and the quasi-steady magnetic field.

FIG. 8 is a conceptual diagram illustrating the coordinate system for the reconstruction illustrated in FIG. 7. FIG. 8 expresses the measurement plane and the reconstruction plane in an xyz orthogonal coordinate system.

z is a coordinate value in the z-direction from the top of vehicle 101 toward the bottom, x is a coordinate value in the x-direction orthogonal to the z-direction, and y is a coordinate value in the y-direction orthogonal to the z-direction and the x-direction. For example, the x-direction corresponds to the left-right direction of vehicle 101, and the y-direction corresponds to the front-rear direction of vehicle 101. Alternatively, the x-direction corresponds to the front-rear direction of vehicle 101 and the y-direction corresponds to the left-right direction of vehicle 101. Moreover, the magnetic field is sensed at z=0. That is, z=0 corresponds to the measurement plane.

For example, the fundamental equation of the steady magnetic field and the quasi-steady magnetic field in free space "without a magnetic source including an induced magnetic field" is expressed by Laplace's equation. More specifically, the following Equation (1) holds true for $H_i$(x, y, z), which is the i-component of the magnetic field vector in the xyz orthogonal coordinate system.

[Math. 1]

$$\Delta H_i = 0 \qquad (1)$$

For example, i is x, y, or z. $\Delta$ is the Laplacian, also called the Laplacian operator. A general solution of the above Equation (1) is expressed by the following Equation (2) as the sum of an exponentially increasing term and an exponentially decaying term in the z-direction.

[Math. 2]

$$H_i(x, y, z) = \qquad (2)$$
$$\frac{1}{(2\pi)^2} \int \int e^{ik_x x + ik_y y} \left\{ a(k_x, k_y) e^{z\sqrt{k_x^2 + k_y^2}} + b(k_x, k_y) e^{-z\sqrt{k_x^2 + k_y^2}} \right\} dk_x dk_y$$

In Equation (2) above, $k_x$ and $k_y$ represent the wavenumbers in the x- and y-directions, respectively. Also, $a(k_x, k_y)$ and $b(k_x, k_y)$ are functions expressed in terms of $k_x$ and $k_y$. In this example, the magnetic source is assumed to be on the positive side in the z-direction. Therefore, for convenience, terms that decay exponentially in the z-direction are omitted. Therefore, Equation (2) is expressed as Equation (3) below.

[Math. 3]

$$H_i(x, y, z) = \frac{1}{(2\pi)^2} \int \int e^{ik_x x + ik_y y} \left\{ a(k_x, k_y) e^{z\sqrt{k_x^2 + k_y^2}} \right\} dk_x dk_y \qquad (3)$$

For example, $H_i$(x, y, 0), which is the i component of the magnetic field vector in the z=0 plane, is obtained by the measurement. Using this, $a(k_x, k_y)$ in Equation (3) is calculated as in Equation (4) below.

[Math. 4]

$$a(k_x, k_y) = f(k_x, k_y) \qquad (4)$$

Here, $f(k_x, k_y)$ is the two-dimensional Fourier transform image of $H_i$(x, y, 0). By substituting Equation (4) into Equation (3), $H_i$(x, y, z) is obtained as in Equation (5) below.

[Math. 5]

$$H_i(x, y, z) = \frac{1}{(2\pi)^2} \int \int e^{ik_x x + ik_y y} \left\{ f(k_x, k_y) e^{z\sqrt{k_x^2 + k_y^2}} \right\} dk_x dk_y \qquad (5)$$

As described above, Equation (5) representing the magnetic field (specifically, the i component of the magnetic field vector) is derived according to the sensing result of the magnetic field and the fundamental equation of the steady magnetic field and the quasi-steady magnetic field.

That is, it is possible to derive the solution of Laplace's equation, which is the fundamental equation of the steady magnetic field and the quasi-steady magnetic field in the free space, using $H_i$(x, y, 0), which is a Dirichlet-type boundary condition. More specifically, it is possible to derive $H_i$(x, y, z) at any z-coordinate in a space where no magnetic source exists. That is, it is possible to reconstruct the magnetic field on a reconstruction plane close to marker 105 from the magnetic field on a measurement plane that is an xy plane at z=0.

For example, $H_i$(x, y, 0) is obtained as the sensing result at the measurement plane at z=0. $f(k_x, k_y)$ is obtained by performing a two-dimensional Fourier transform with respect to x and y on $H_i$(x, y, 0) obtained from the sensing result. By substituting $f(k_x, k_y)$ obtained by the two-dimensional Fourier transform and z-coordinate value $z_a$ of the reconstruction plane into Equation (5), $H_i$(x, y, $z_a$) on the reconstruction plane is obtained. This makes it possible to accurately obtain information on the magnetic field in the reconstruction plane.

Ultimately, $H_i(x, y, z_a)$ on the reconstruction plane is expressed as Equation (6) below.

[Math. 6]

$$H_i(x, y, z_a) = \frac{1}{(2\pi)^2} \int \int e^{ik_x x + ik_y y} \left\{ f(k_x, k_y) e^{z_a \sqrt{k_x^2 + k_y^2}} \right\} dk_x dk_y \qquad (6)$$

Information processing circuit 103 may generate an image expressed by $H_i(x, y, z_a)$ in the above Equation (6) as the image representing the magnetic field on the reconstruction plane.

In the examples described with reference to FIG. 5 through FIG. 8, one measurement plane is used, but two measurement planes may be used. This will be described in greater detail below with reference to FIG. 9 through FIG. 12.

Figure 9:
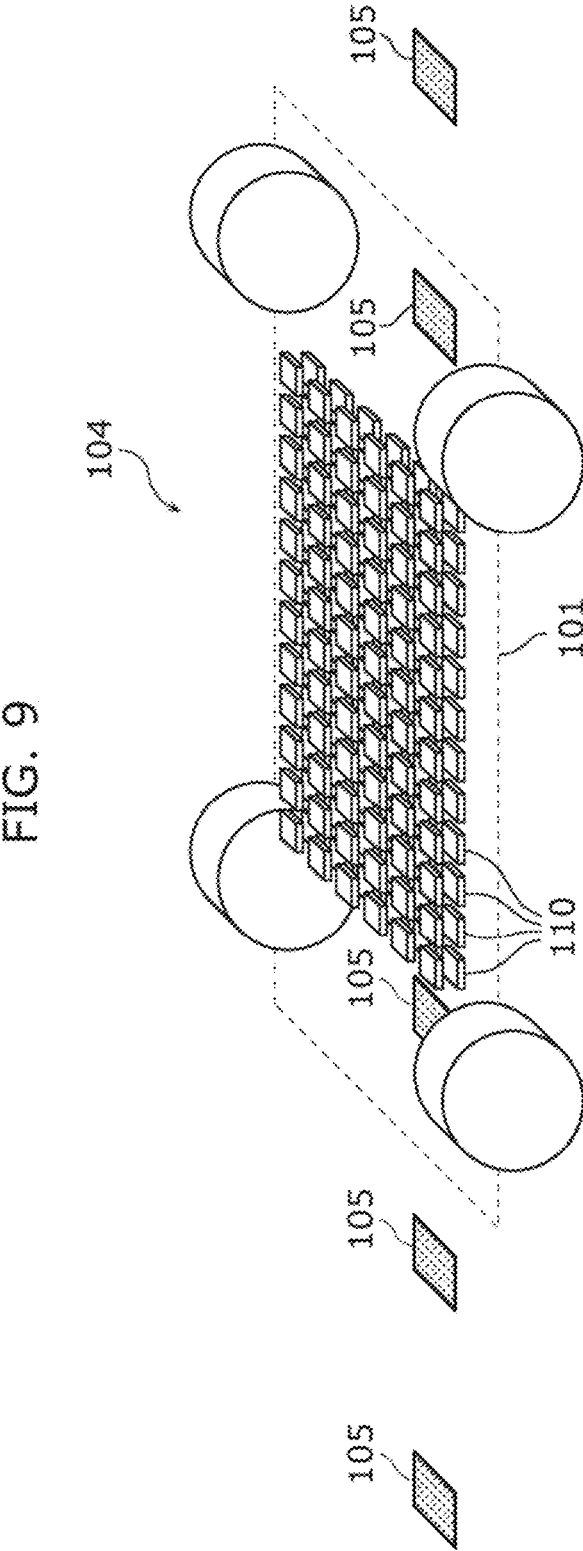
FIG. 9 is a conceptual diagram illustrating a third example of a magnetic sensor array according to an embodiment of the present disclosure.

FIG. 9 is a conceptual diagram illustrating a third example of magnetic sensor array 104 illustrated in FIG. 1. In this example, magnetic sensor array 104 is a combination of a first two-dimensional magnetic sensor array and a second two-dimensional magnetic sensor array, each of which is arranged in the front-rear direction and the left-right direction of vehicle 101.

Each of the first two-dimensional magnetic sensor array and the second two-dimensional magnetic sensor array arranged in the front-rear direction and the left-right direction of vehicle 101 includes a plurality of magnetic sensors 110 arranged in the front-rear direction and the left-right direction of vehicle 101. The position of the first two-dimensional magnetic sensor array and the position of the second two-dimensional magnetic sensor array are different from each other in the up-down direction of vehicle 101.

Figure 10:
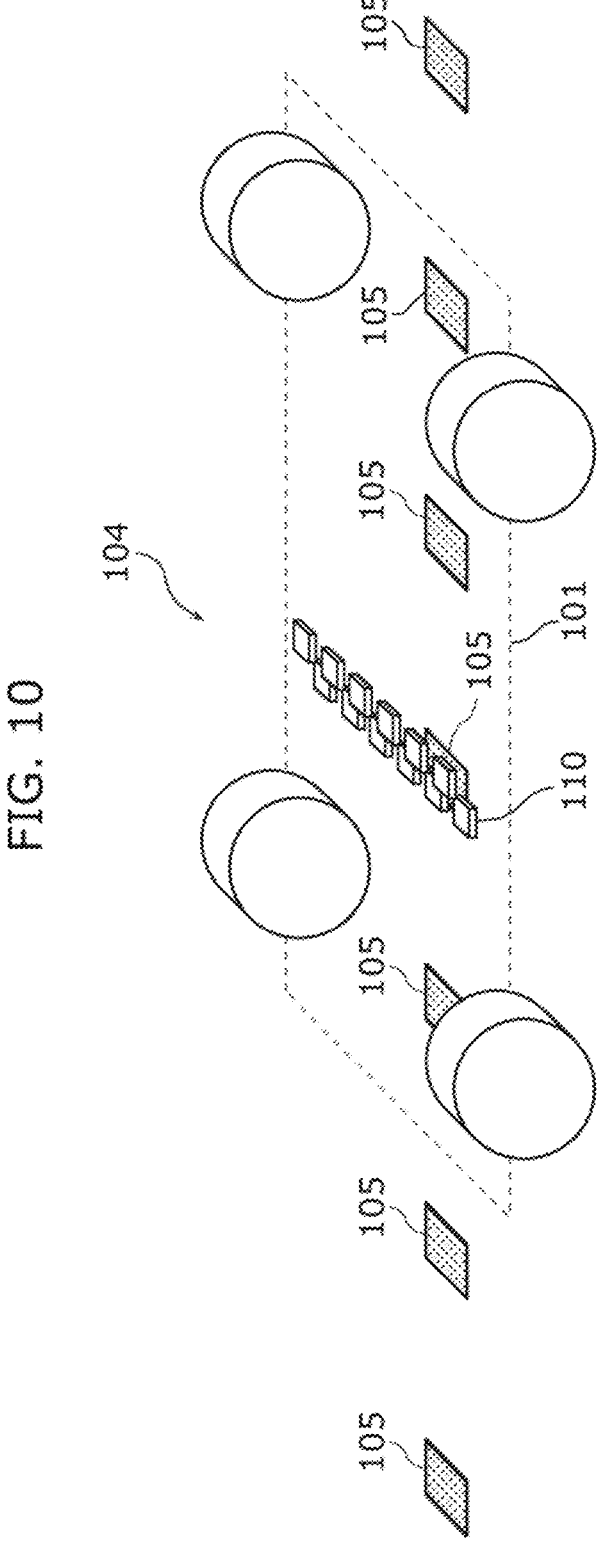
FIG. 10 is a conceptual diagram illustrating a fourth example of a magnetic sensor array according to an embodiment of the present disclosure.

FIG. 10 is a conceptual diagram illustrating a fourth example of magnetic sensor array 104 illustrated in FIG. 1. In this example, magnetic sensor array 104 is a combination of a first one-dimensional magnetic sensor array and a second one-dimensional magnetic sensor array, each of which is arranged in the left-right direction of vehicle 101.

Each of the first one-dimensional magnetic sensor array and the second one-dimensional magnetic sensor array arranged in the left-right direction of vehicle 101 includes a plurality of magnetic sensors 110 arranged in the left-right direction of vehicle 101. The position of the first one-dimensional magnetic sensor array and the position of the second one-dimensional magnetic sensor array are different from each other in the up-down direction of vehicle 101.

Although the position of the first one-dimensional magnetic sensor array and the position of the second one-dimensional magnetic sensor array in the front-rear direction of vehicle 101 are different from each other in this example, they may coincide with each other.

Figure 11:
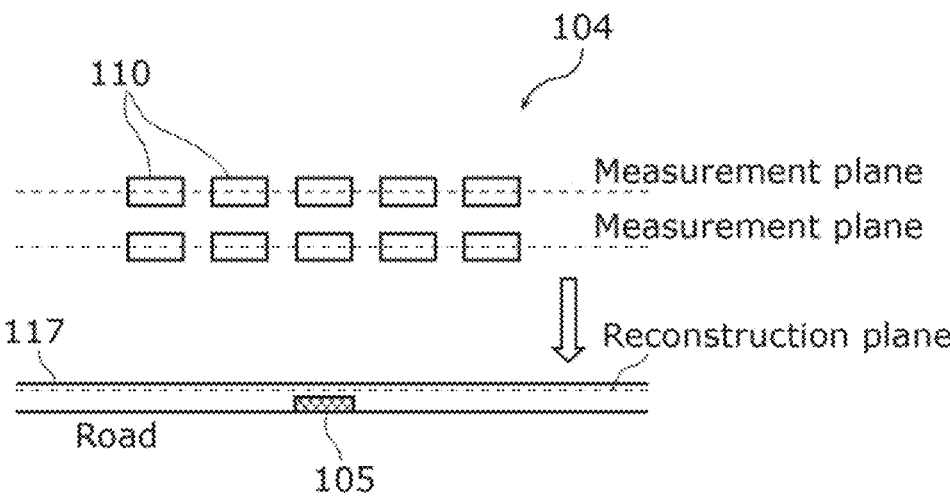
FIG. 11 is a conceptual diagram illustrating a second example of reconstruction according to an embodiment of the present disclosure.

FIG. 11 is a conceptual diagram illustrating a second example of the reconstruction according to the present embodiment. For example, in the example of FIG. 10, by vehicle 101 traveling, magnetic sensor array 104, which is a combination of two one-dimensional magnetic sensor arrays, can scan two measurement planes above marker 105. This makes it possible to obtain a sensing result of magnetism on two measurement planes. In the example illustrated in FIG. 9 as well, it is possible to obtain a sensing result of magnetism on two measurement planes. The speed of vehicle 101 may be used in the examples of FIG. 9 and FIG. 10, similar to the examples of FIG. 5 and FIG. 6.

Information processing circuit 103 generates an image showing the magnetic field in a reconstruction plane closer to marker 105 than the two measurement planes, according to the sensing result of magnetism in the two measurement planes and the fundamental equation of the steady magnetic field and the quasi-steady magnetic field.

Figure 12:
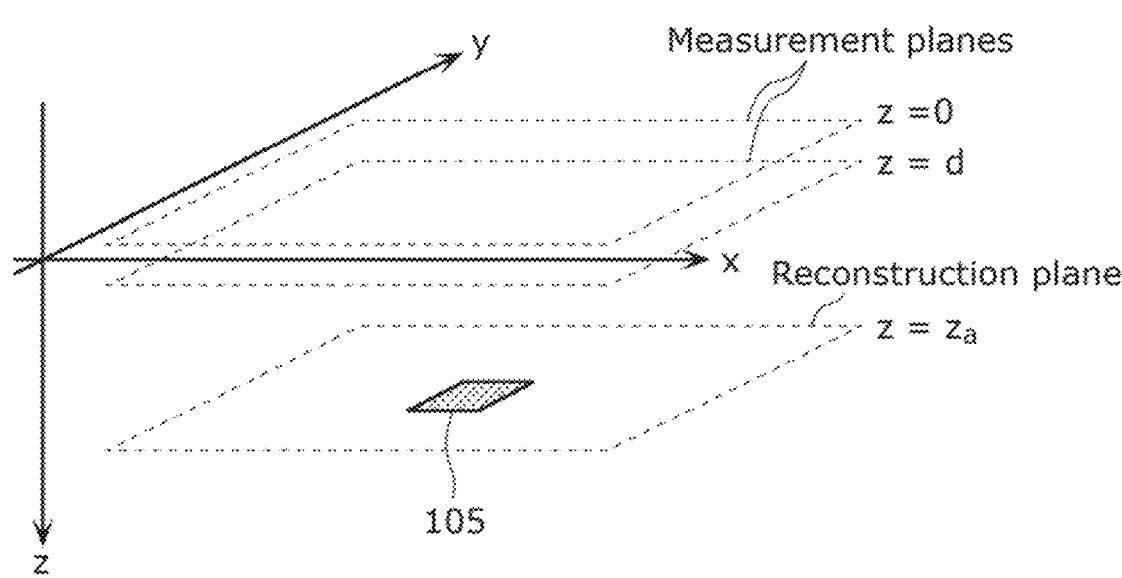
FIG. 12 is a conceptual diagram illustrating a coordinate system for the second example of the reconstruction according to an embodiment of the present disclosure.

FIG. 12 is a conceptual diagram illustrating the coordinate system for the reconstruction illustrated in FIG. 11. FIG. 12 expresses the two measurement planes and the reconstruction plane in an xyz orthogonal coordinate system. As in the example in FIG. 8, z is a coordinate value in the z-direction from the top of vehicle 101 toward the bottom, x is a coordinate value in the x-direction orthogonal to the z-direction, and y is a coordinate value in the y-direction orthogonal to the z-direction and the x-direction. Moreover, the magnetic field is sensed at z=0 and z=d. That is, z=0 and z=d correspond to the two measurement planes.

As described above, the above Equation (1) holds true for $H_i(x, y, z)$, which is the i-component of the magnetic field vector in the xyz orthogonal coordinate system. In addition, the general solution of the above Equation (1) is expressed as the above Equation (2).

In this example, the magnetic sources are assumed to be on both the positive side and the negative side in the z-direction. For example, there may be a marker 105 on the positive side in the z-direction, and a magnetic noise source on the negative side in the z-direction. Accordingly, terms that decay exponentially in the z-direction are not omitted.

For example, the measurement yields i-component $H_i(x, y, 0)$ of the magnetic field vector in the plane of z=0, and the z-direction gradient $\partial/\partial z H_i(x, y, z)|_{z=0}$ of the i-component of the magnetic field vector. Using these, $a(k_x, k_y)$ and $b(k_x, k_y)$ in Equation (2) can be obtained as illustrated in Equation (7) and Equation (8) below, respectively.

[Math. 7]

$$a(k_x, k_y) = \frac{1}{2}\left( f(k_x, k_y) + \frac{g(k_x, k_y)}{\sqrt{k_x^2 + k_y^2}} \right) \qquad (7)$$

[Math. 8]

$$b(k_x, k_y) = \frac{1}{2}\left( f(k_x, k_y) - \frac{g(k_x, k_y)}{\sqrt{k_x^2 + k_y^2}} \right) \qquad (8)$$

In Equations (7) and (8), $f(k_x, k_y)$ is the two-dimensional Fourier transform image of $H_i(x, y, 0)$, and $g(k_x, k_y)$ is the two-dimensional Fourier transform image of $\partial/\partial z H_i(x, y, z)|$ z=0. By substituting Equation (7) and Equation (8) into Equation (2), $H_i(x, y, z)$ is obtained as in Equation (9) below.

[Math. 9]

$$H_i(x, y, z) = \qquad (9)$$

$$\frac{1}{(2\pi)^2} \int \int e^{ik_x x + ik_y y} \left\{ \frac{1}{2}\left( f(k_x, k_y) + \frac{g(k_x, k_y)}{\sqrt{k_x^2 + k_y^2}} \right) e^{z\sqrt{k_x^2 + k_y^2}} + \right.$$

$$\left. \frac{1}{2}\left( f(k_x, k_y) - \frac{g(k_x, k_y)}{\sqrt{k_x^2 + k_y^2}} \right) e^{-z\sqrt{k_x^2 + k_y^2}} \right\} dk_x dk_y$$

As described above, Equation (9) representing the magnetic field (specifically, the i component of the magnetic field vector) is derived according to the sensing result of the magnetic field and the fundamental equation of the steady magnetic field and the quasi-steady magnetic field in the free space.

That is, using $H_i(x, y, 0)$, which is the Dirichlet-type boundary condition, and $\partial/\partial z H_i(x, y, z)|_{z=0}$, which is the Neumann-type boundary condition, it is possible to derive the solution of Laplace's equation, which is the fundamental equation of the steady magnetic field and the quasi-steady magnetic field in the free space. More specifically, it is possible to derive $H_i(x, y, z)$ at any z-coordinate in a space where no magnetic source exists. That is, it is possible to reconstruct the magnetic field on a reconstruction plane close to marker 105 from the magnetic field on a measurement plane that is an xy plane at z=0 and a measurement plane in the vicinity thereof.

For example, $H_i(x, y, 0)$ is obtained as the sensing result at the measurement plane at z=0. $\partial/\partial z H_i(x, y, z)|_{z=0}$ is calculated according to the sensing results at the two measurement planes. For example, a sensing result at the measurement plane at z=0 and a sensing result at the measurement plane at z=d are obtained, and by dividing their difference by d, which is the distance between these two measurement planes, $\partial/\partial z H_i(x, y, z)|_{z=0}$ is approximately obtained.

Then, $f(k_x, k_y)$ and $g(k_x, k_y)$ are obtained by performing a two-dimensional Fourier transform with respect to x and y on $H_i(x, y, 0)$ and $\partial/\partial z H_i(x, y, z)|_{z=0}$ obtained from the sensing results. By substituting $f(k_x, k_y)$ and $g(k_x, k_y)$ obtained by the two-dimensional Fourier transform and z-coordinate value $z_a$ of the reconstruction plane into Equation (9), $H_i(x, y, z_a)$ on the reconstruction plane is obtained. This makes it possible to accurately obtain information on the magnetic field in the reconstruction plane.

Ultimately, $H_i(x, y, z_a)$ on the reconstruction plane is expressed as Equation (10) below.

[Math. 10]

$$H_i(x, y, z_a) = \tag{10}$$
$$\frac{1}{(2\pi)^2} \int \int e^{ik_x x + ik_y y} \left\{ \frac{1}{2}\left( f(k_x, k_y) + \frac{g(k_x, k_y)}{\sqrt{k_x^2 + k_y^2}} \right) e^{z_a\sqrt{k_x^2 + k_y^2}} + \right.$$
$$\left. \frac{1}{2}\left( f(k_x, k_y) - \frac{g(k_x, k_y)}{\sqrt{k_x^2 + k_y^2}} \right) e^{-z_a\sqrt{k_x^2 + k_y^2}} \right\} dk_x dk_y$$

Information processing circuit 103 may generate an image expressed by $H_i(x, y, z_a)$ in the above Equation (10) as the image representing the magnetic field on the reconstruction plane.

Figure 13:
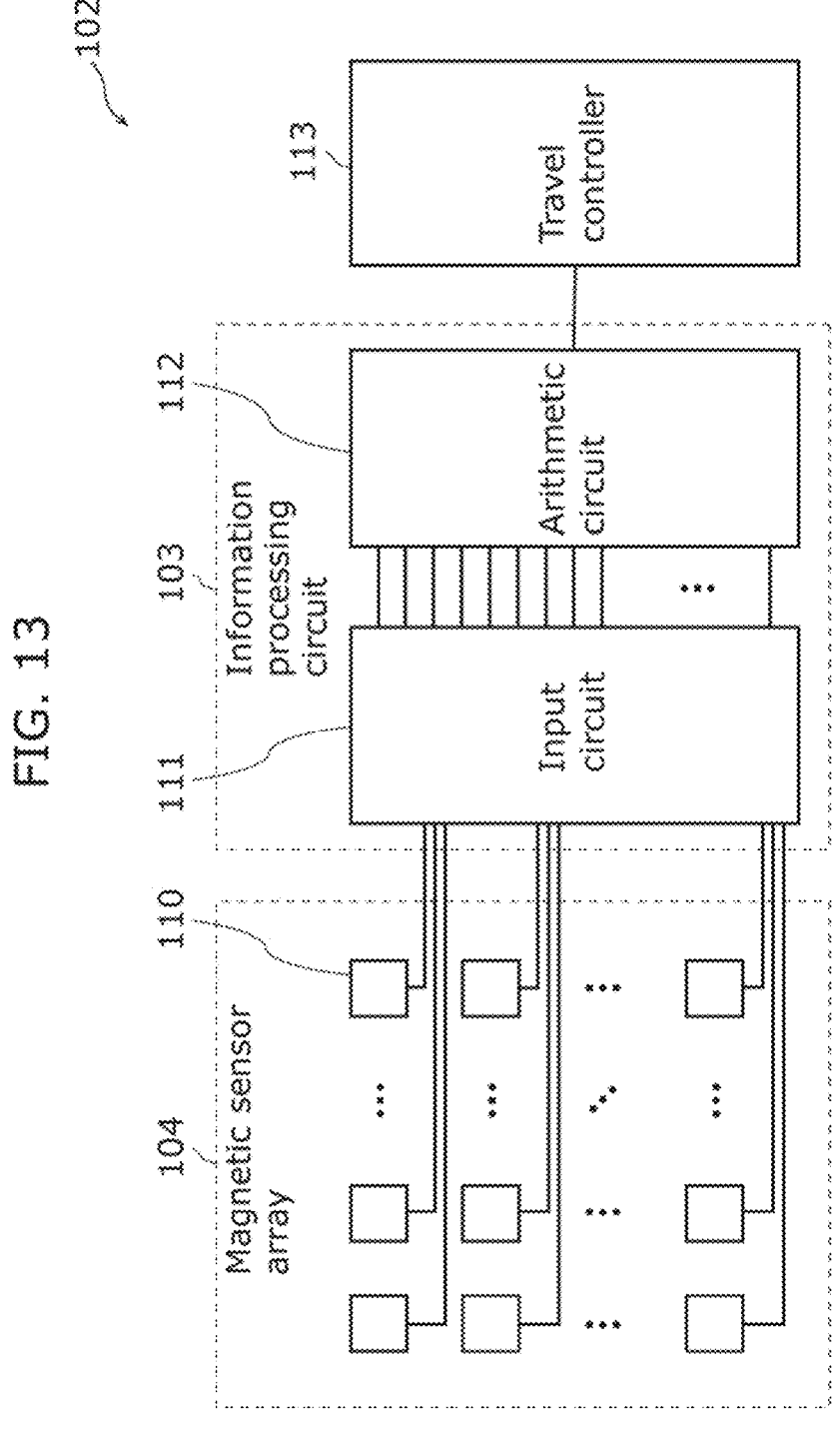
FIG. 13 is a block diagram illustrating the details of the configuration of the autonomous driving control system according to an embodiment of the present disclosure.

FIG. 13 is a block diagram illustrating the details of the configuration of autonomous driving control system 102 illustrated in FIG. 1. As described above, autonomous driving control system 102 includes magnetic sensor array 104 and information processing circuit 103.

Autonomous driving control system 102 may further include travel controller 113. Travel controller 113 is a device for driving vehicle 101 and includes a power source, actuators, electric circuits, and the like. For example, information processing circuit 103 may control the travel of vehicle 101 via travel controller 113 by transmitting a control signal for controlling the travel of vehicle 101 to travel controller 113.

Magnetic sensor array 104 includes a plurality of magnetic sensors 110. Information processing circuit 103 includes input circuit 111 and arithmetic circuit 112.

Input circuit 111 is an electric circuit for obtaining information and inputting information to arithmetic circuit 112. For example, input circuit 111 obtains a sensing result of magnetism from magnetic sensor array 104. More specifically, input circuit 111 obtains a sensing result of magnetism from each magnetic sensor 110 included in magnetic sensor array 104. Input circuit 111 inputs the sensing result of magnetism to arithmetic circuit 112.

Input circuit 111 may perform AD conversion (analog-to-digital conversion). For example, input circuit 111 may obtain a sensing result of magnetism from magnetic sensor array 104 as an analog signal. Input circuit 111 may convert the sensing result obtained as an analog signal into a digital signal. Input circuit 111 may input the sensing result converted into a digital signal to arithmetic circuit 112.

Arithmetic circuit 112 is an electric circuit for performing computational processing. For example, arithmetic circuit 112 performs the computational processing described above. More specifically, arithmetic circuit 112 calculates the magnetic field in the reconstruction plane from the magnetic field in the measurement plane, and generates an image showing the magnetic field in the reconstruction plane. Arithmetic circuit 112 may transmit a control signal for controlling the travel of vehicle 101 to travel controller 113 in accordance with the generated image.

Figure 14:
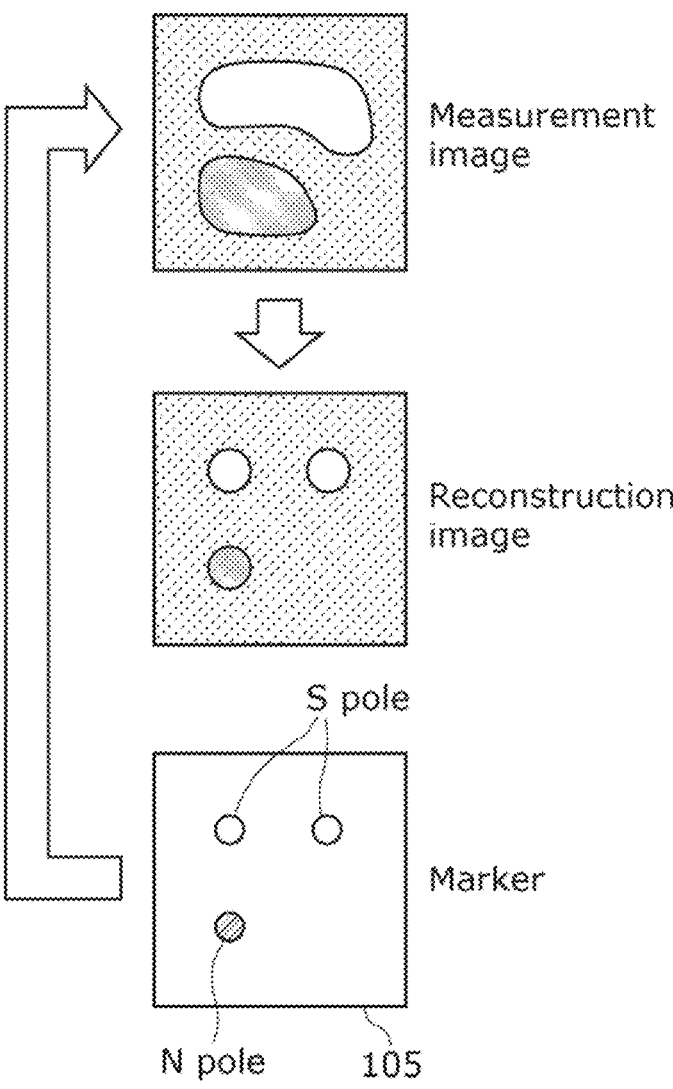
FIG. 14 is a conceptual diagram illustrating a marker, a measurement image, and a reconstruction image according to an embodiment of the present disclosure.

FIG. 14 is conceptual diagram illustrating marker 105, a measurement image, and a reconstruction image according to the present embodiment. Marker 105 includes a plurality of magnetic poles comprising one or more N poles and one or more S poles. Magnetic sensor array 104 senses the magnetism of a magnetic field that includes a magnetic field component induced by marker 105. The sensing result is obtained as a measurement image.

However, magnetic sensor array 104 is disposed at a position where it does not collide with the road surface. Magnetic sensor array 104 is therefore spaced from marker 105 provided on the road. The magnetic poles of marker 105 thus do not appear clearly in the measurement image.

Information processing circuit 103 generates, as a reconstruction image, an image showing the magnetic field in a region closer to marker 105 than magnetic sensor array 104, according to the sensing result of magnetism and the fundamental equation of the steady magnetic field and the quasi-steady magnetic field. In such a reconstruction image, the magnetic poles of marker 105 appear clearly. Therefore, information processing circuit 103 can appropriately identify marker 105 according to the reconstruction image.

Figure 15:
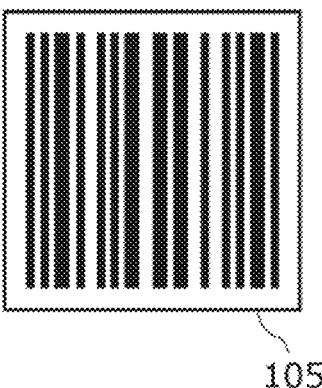
FIG. 15 is a conceptual diagram illustrating a first example of a marker according to an embodiment of the present disclosure.

FIG. 15 is a conceptual diagram illustrating a first example of marker 105. For example, in FIG. 15, the black portion is the N pole portion of marker 105. The white portion is the portion of marker 105 other than the N pole. Stated differently, the white portion is the S pole portion of marker 105, or the portion of marker 105 that is neither the N pole nor the S pole. "N pole" and "S pole" may be switched in this description.

As illustrated in FIG. 15, the magnetic poles of marker 105 may constitute a barcode. Marker 105 may represent a code sequence, via a barcode, for controlling travel of vehicle 101. Accordingly, various information for controlling travel of vehicle 101 can be expressed.

Figure 16:
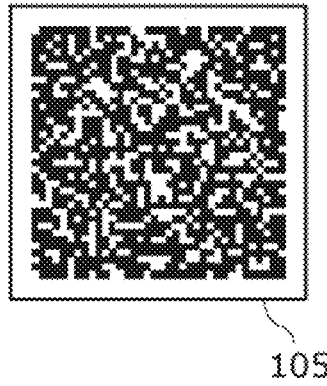
FIG. 16 is a conceptual diagram illustrating a second example of a marker according to an embodiment of the present disclosure.

FIG. 16 is a conceptual diagram illustrating a second example of marker 105. For example, just like in the example illustrated in FIG. 15, in FIG. 16, the black portion is the N pole portion of marker 105, and the white portion is the portion of marker 105 other than the N pole. "N pole" and "S pole" may be switched in this description.

As illustrated in FIG. 16, the magnetic poles of marker 105 may constitute a two-dimensional code such as a QR code (registered trademark). Marker 105 may represent a code sequence, via a two-dimensional code, for controlling travel of vehicle 101. Accordingly, a wider variety of information can be expressed.

For example, marker 105 may indicate 4 types of control-travel straight, turn right, turn left, and stop-using 2 bits. One bit may be expressed by one section of the N pole or S pole in marker 105. However, noise may be generated by, for example, manholes and fallen objects. Therefore, marker 105 may represent these controls using a greater number of bits.

Magnetic sensor array 104 is disposed approximately 50 cm away from the road surface (for example, on the underside of an ordinary vehicle) so as not to collide with the road surface. Stated differently, magnetic sensor array 104 is disposed approximately 50 cm away from marker 105. Information processing circuit 103 generates a reconstruction image showing the magnetic field in a reconstruction plane approximately 50 cm below magnetic sensor array 104 in the up-down direction of vehicle 101.

However, as the distance from marker 105 increases, the magnetic field component induced by marker 105 diffuses and the contrast of the measurement image decreases. This may result in the reconstruction image not being appropriately obtained.

Therefore, when magnetic sensor array 104 is approximately 50 cm away from marker 105, in order to obtain appropriate measurement images and reconstruction images, the N pole and S pole in marker 105 should have a width of approximately 10 cm. In other words, one section in the barcode or two-dimensional code of marker 105 should have a width of 10 cm or greater.

For example, the barcode or two-dimensional code of marker 105 has a size corresponding to a value obtained by multiplying the above-mentioned width by the number of bits used to represent the control of vehicle 101.

It is desirable that at least one of the plurality of markers 105 is present underneath vehicle 101 so that vehicle 101 does not deviate from the row of the plurality of markers 105. Therefore, the plurality of markers 105 should be arranged at intervals shorter than the length of vehicle 101 in the front-rear direction of vehicle 101 (for example, 5 m).

Figure 17:
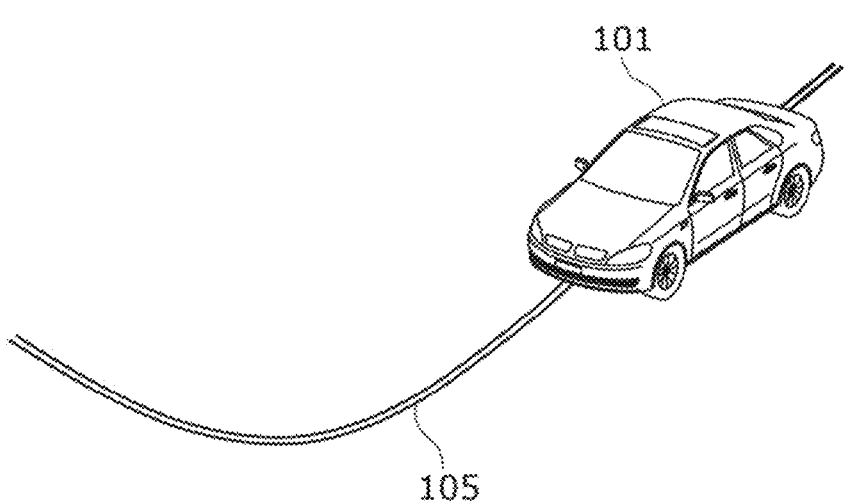
FIG. 17 is a conceptual diagram illustrating a third example of a marker according to an embodiment of the present disclosure.

FIG. 17 is a conceptual diagram illustrating a third example of marker 105. In this example, magnetic wire is used as marker 105. For example, the magnetic wire is a ferrite rope and induces a magnetic field component. More specifically, magnetic wire may be provided along the road as marker 105. Information processing circuit 103 may drive vehicle 101 along the road by driving vehicle 101 along the magnetic wire. This appropriately inhibits vehicle 101 from deviating from the road.

Figure 18:
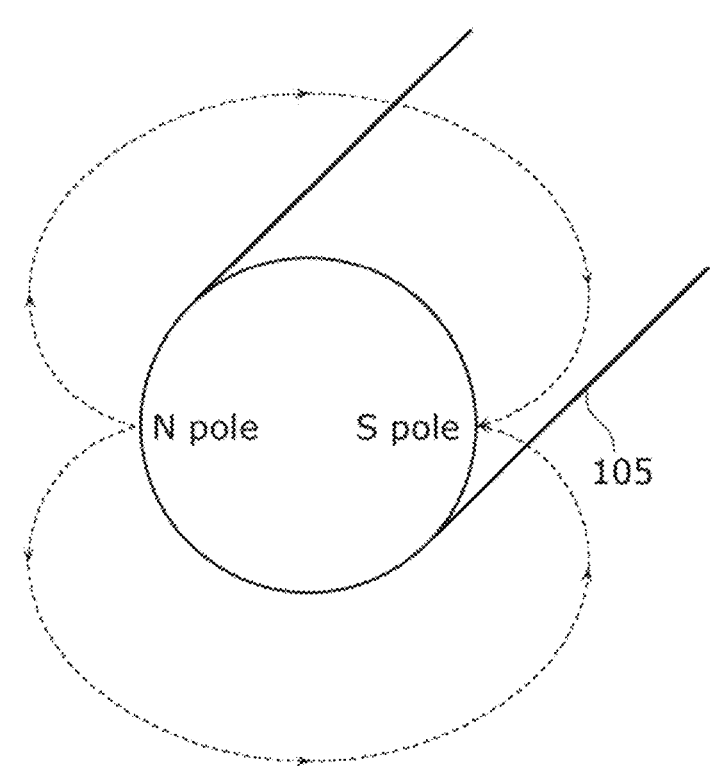
FIG. 18 is a conceptual diagram illustrating the magnetic field around a magnetic wire according to an embodiment of the present disclosure.

FIG. 18 is a conceptual diagram illustrating the magnetic field around the magnetic wire used as marker 105. The magnetic wire is polarized in the width direction of the magnetic wire, with the N pole and S pole straddling the center axis of the magnetic wire.

Figure 19:
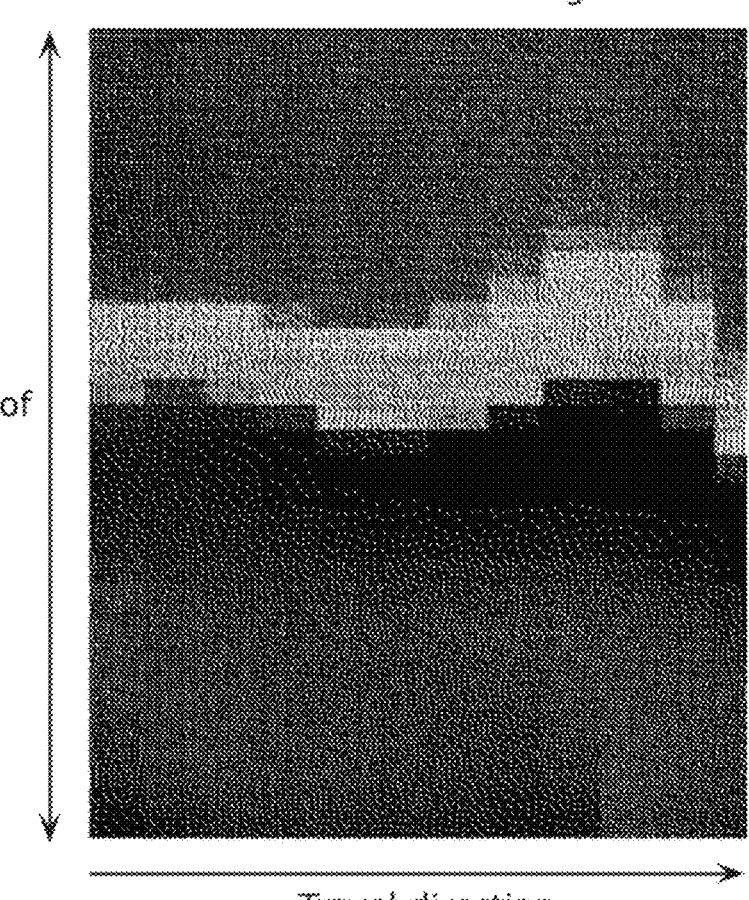
FIG. 19 shows a reconstruction image in a case where a magnetic wire is used according to an embodiment of the present disclosure.

FIG. 19 shows a reconstruction image in a case where a magnetic wire is used as marker 105. For example, magnetic sensor array 104 is a one-dimensional magnetic sensor array arranged in the arrangement direction illustrated in FIG. 19, and moves in the travel direction illustrated in FIG. 19. The reconstruction image is generated by information processing circuit 103 as an image showing a magnetic field close to marker 105. In the reconstruction image of FIG. 19, the white portion corresponds to the N pole, and the black portion corresponds to the S pole.

As illustrated in the reconstruction image of FIG. 19, a portion corresponding to the N pole of the magnetic wire and a portion corresponding to the S pole of the magnetic wire are observed. In other words, FIG. 19 clearly shows the magnetic field around the magnetic wire used as marker 105 in the reconstruction image. Accordingly, the travel of vehicle 101 is appropriately controlled.

Figure 20:
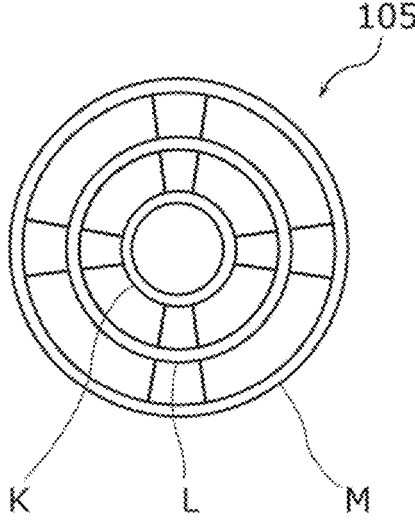
FIG. 20 is a conceptual diagram illustrating a fourth example of a marker according to an embodiment of the present disclosure.

FIG. 20 is a conceptual diagram illustrating a fourth example of marker 105. In this example, a concentric marker 105 is used. Stated differently, marker 105 includes concentric magnetic poles. For example, magnetic wires are arranged in circular shapes with radii of 5 cm, 10 cm, and 15 cm, and are fixed by a support member. As illustrated in FIG. 20, positions where a magnetic wire can be arranged are defined as K, L, and M. The magnetic pattern of marker 105 is determined by where among K, L, and M the magnetic wires are actually arranged.

A magnetic wire may be arranged in one of K, L, or M, may be arranged in two of them, or may be arranged in all three. Stated differently, the possible magnetic wire arrangements are K, L, M, KL, KM, LM, and KLM. In this way, seven magnetic patterns can be used.

Figure 21:
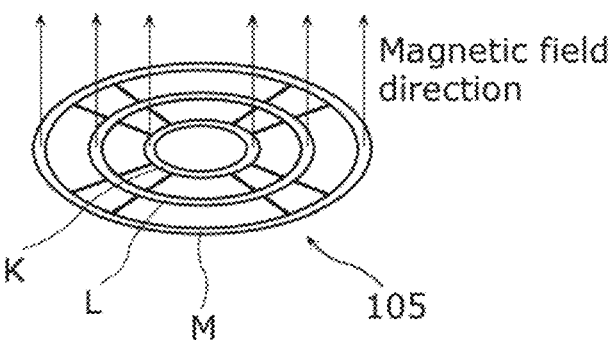
FIG. 21 is a conceptual diagram illustrating the magnetic field direction around a concentric marker according to an embodiment of the present disclosure.

FIG. 21 is a conceptual diagram illustrating the magnetic field direction around concentric marker 105. For example, when marker 105 is provided on the road, the magnetic wires are arranged such that the magnetic field direction is oriented upward from marker 105. More specifically, the magnetic wire is arranged such that the N pole is positioned on the upper side.

Note that the magnetic wire may be arranged such that the S pole is positioned on the upper side, or arranged such that the S pole is on the inner side and the N pole is on the outer side, or arranged such that the N pole is on the inner side and the S pole is on the outer side.

For example, the magnetic pattern becomes more easily identifiable if the orientation of K, L, and M is consistent such that one of the N pole or S pole is positioned on the upper side for all of them.

Figure 22:
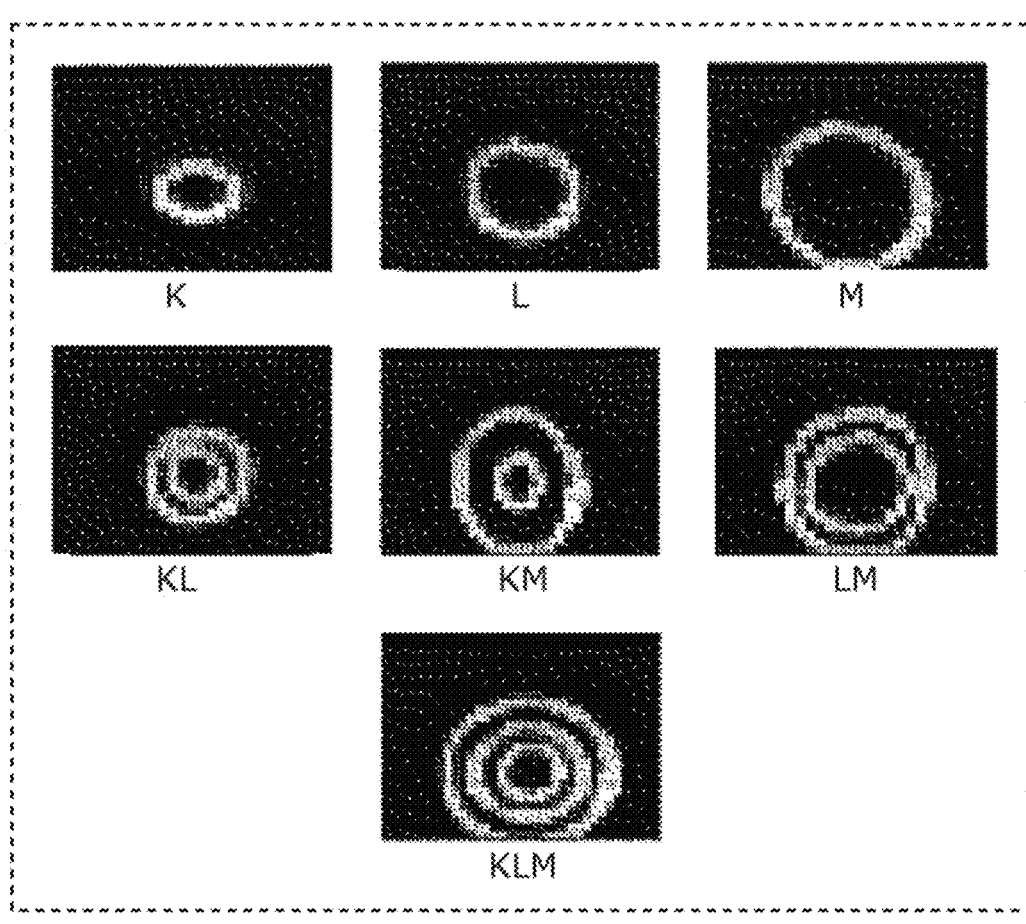
FIG. 22 shows reconstruction images in a case where a concentric marker is used according to an embodiment of the present disclosure.

FIG. 22 shows reconstruction images in a case where concentric marker 105 is used. Reconstruction images such as those illustrated in FIG. 22 are generated by information processing circuit 103 for each of the following magnetic wire arrangements: K, L, M, KL, KM, LM, and KLM. In the reconstruction image of FIG. 22, the white portion corresponds to the N pole, and the black portion corresponds to the S pole.

As illustrated in FIG. 22, reconstruction images corresponding to each magnetic pattern are generated. Accordingly, information processing circuit 103 can appropriately identify the magnetic pattern based on the reconstruction image, and can appropriately control the travel of vehicle 101 based on the magnetic pattern. Information processing circuit 103 can appropriately identify the magnetic pattern regardless of the orientation of vehicle 101, and can appropriately read control information such as turn right, turn left, or travel straight indicated by the magnetic pattern.

Here, three circles are used, but two or fewer circles may be used, or four or more circles may be used. The number of circles determines the number of magnetic patterns and the number of types of control.

Figure 23:
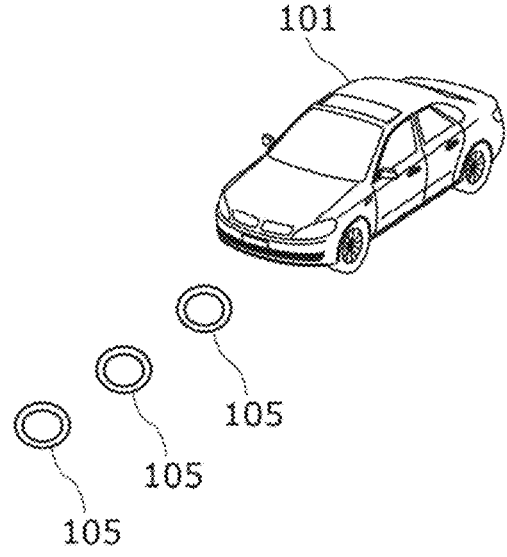
FIG. 23 is a conceptual diagram illustrating a fifth example of a marker according to an embodiment of the present disclosure.

FIG. 23 is a conceptual diagram illustrating a fifth example of marker 105. In this example, an electric conductor is used as marker 105. For example, the electric conductor used as marker 105 is a closed circuit of a metal such as copper. An annular (ring-shaped) electric conductor may be used as marker 105, or a coil-shaped electric conductor may be used as marker 105.

Marker 105, which is an electric conductor, induces a magnetic field component by electromagnetic induction. Vehicle 101 is equipped with an induction circuit for generating electromagnetic induction.

Figure 24:
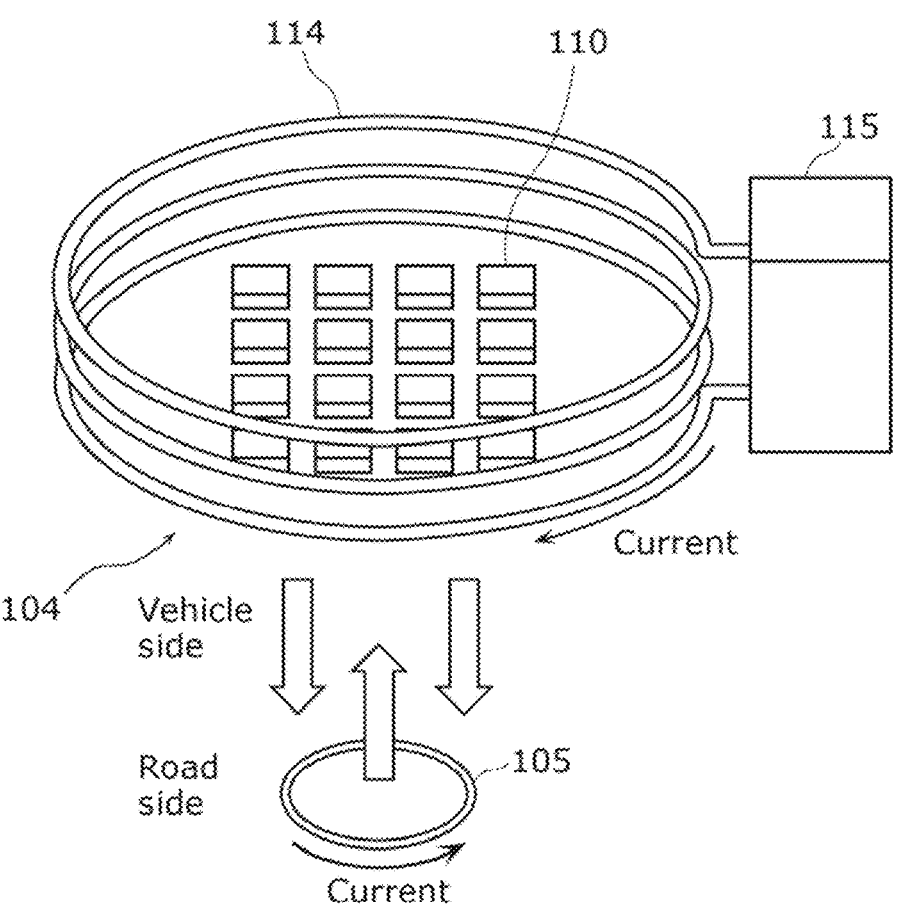
FIG. 24 is a conceptual diagram illustrating an induction circuit according to an embodiment of the present disclosure.

FIG. 24 is a conceptual diagram illustrating the induction circuit equipped on vehicle 101. As illustrated in FIG. 24, induction circuit 114 equipped on vehicle 101 may be a coil connected to power source 115. Induction circuit 114 equipped on vehicle 101 may include power source 115. Induction circuit 114 may be arranged to cover magnetic sensor array 104 that includes the plurality of magnetic sensors 110.

For example, by current flowing in induction circuit 114, induction circuit 114 induces a downward first magnetic field component underneath vehicle 101. As a result, electromagnetic induction occurs, current flows in marker 105, which is an electric conductor, and marker 105 induces an upward second magnetic field component. Magnetic sensor array 104 senses the magnetism of the magnetic field that includes the second magnetic field component.

This enables autonomous driving control system 102 to sense the magnetism of the magnetic field including the magnetic field component induced by marker 105. Autonomous driving control system 102 can generate an image showing the magnetic field in a region close to marker 105, and appropriately control the travel of vehicle 101 according to the image.

For example, the magnetic poles of permanent magnets such as ferrite magnets may be altered by a strong external magnetic field. Stated differently, when marker 105 is a permanent magnet such as a ferrite magnet, the magnetic pattern may be altered by a strong external magnetic field. However, when marker 105 is an electric conductor such as copper, magnetism is appropriately controlled by electromagnetic induction, thereby inhibiting adverse effects such as changes in the magnetic pattern.

For example, marker 105, which is an electric conductor, has a magnetic pattern corresponding to the shape of the electric conductor. The plurality of markers 105 may emit steady magnetic fields or quasi-steady magnetic fields with a plurality of magnetic patterns by having a plurality of shapes.

For example, in vehicle 101, information processing circuit 103 of autonomous driving control system 102 may switch between an operation corresponding to an electric conductor and an operation corresponding to a permanent magnet by switching whether or not to apply current to induction circuit 114.

Figure 25:
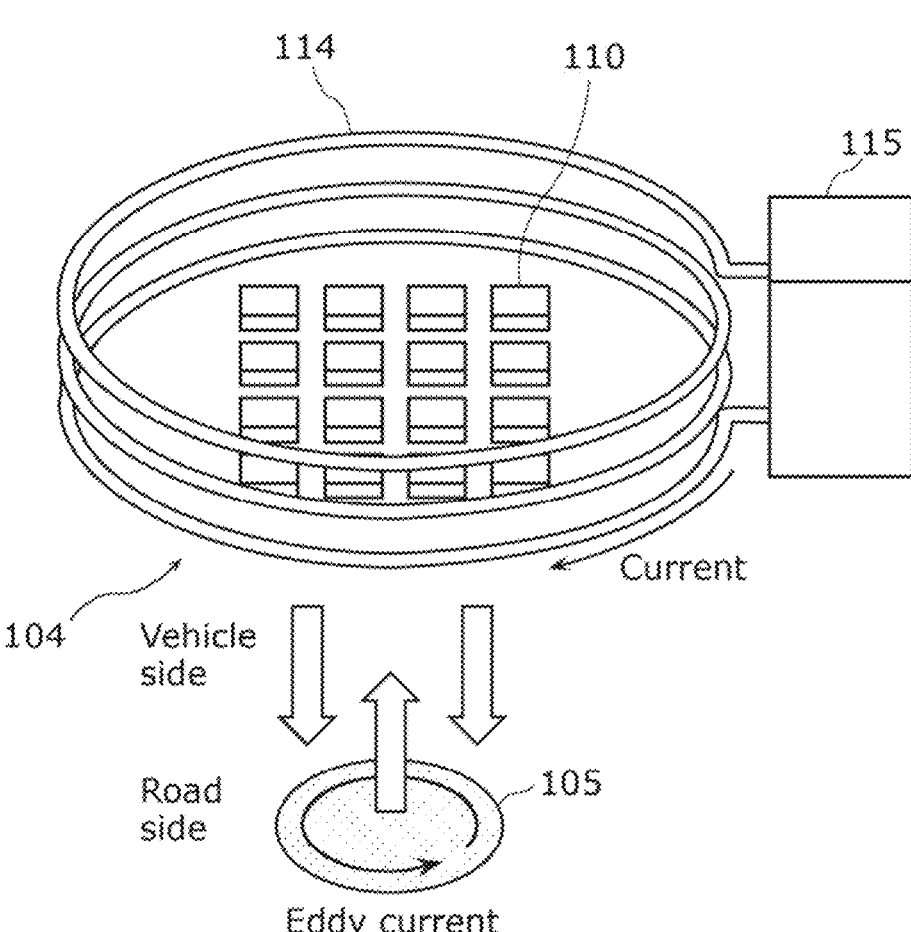
FIG. 25 is a conceptual diagram illustrating another example of an electric conductor according to an embodiment of the present disclosure.

FIG. 25 is a conceptual diagram illustrating another example of the electric conductor used as marker 105. The electric conductor used as marker 105 is not limited to an annular electric conductor, and may be a metal disc or the like. Even when the electric conductor is a metal disc, eddy currents are generated within the metal disc by electromagnetic induction. As a result, a magnetic field component is induced.

More specifically, similar to the example in FIG. 24, for example, a downward first magnetic field component is induced by current flowing in induction circuit 114 of vehicle 101. As a result, electromagnetic induction occurs, eddy currents flow in the metal disc, and the metal disc induces an upward second magnetic field component. Magnetic sensor array 104 senses the magnetism of the magnetic field that includes the second magnetic field component.

This enables autonomous driving control system 102 to sense the magnetism of the magnetic field including the magnetic field component induced by the metal disc installed as marker 105.

Figure 26:
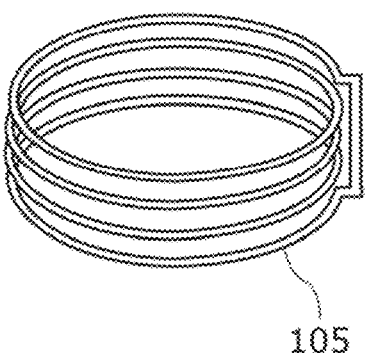
FIG. 26 is a conceptual diagram illustrating yet another example of an electric conductor according to an embodiment of the present disclosure.

FIG. 26 is a conceptual diagram illustrating yet another example of the electric conductor used as marker 105. As illustrated in FIG. 26, the electric conductor used as marker 105 may be a coil-shaped closed circuit. Note that the electric conductor used as marker 105 does not need to be connected to a power source, nor does it need to include a power source.

In the plurality of examples of marker 105 illustrated in FIG. 15 through FIG. 22, an electric conductor that is conductive may be used instead of a magnetic material that is magnetic.

For example, in the example illustrated in FIG. 15, there may be a coil in the black portion and no coil in the white portion. Alternatively, in the example illustrated in FIG. 15, there may be no coil in the black portion and a coil in the white portion. Similarly, in the example illustrated in FIG. 16, there may be a coil in the black portion and no coil in the white portion. Alternatively, in the example illustrated in FIG. 16, there may be no coil in the black portion and a coil in the white portion. Even when an electric conductor is used, the control and other aspects explained in FIG. 15 and FIG. 16 can be applied.

Figure 27:
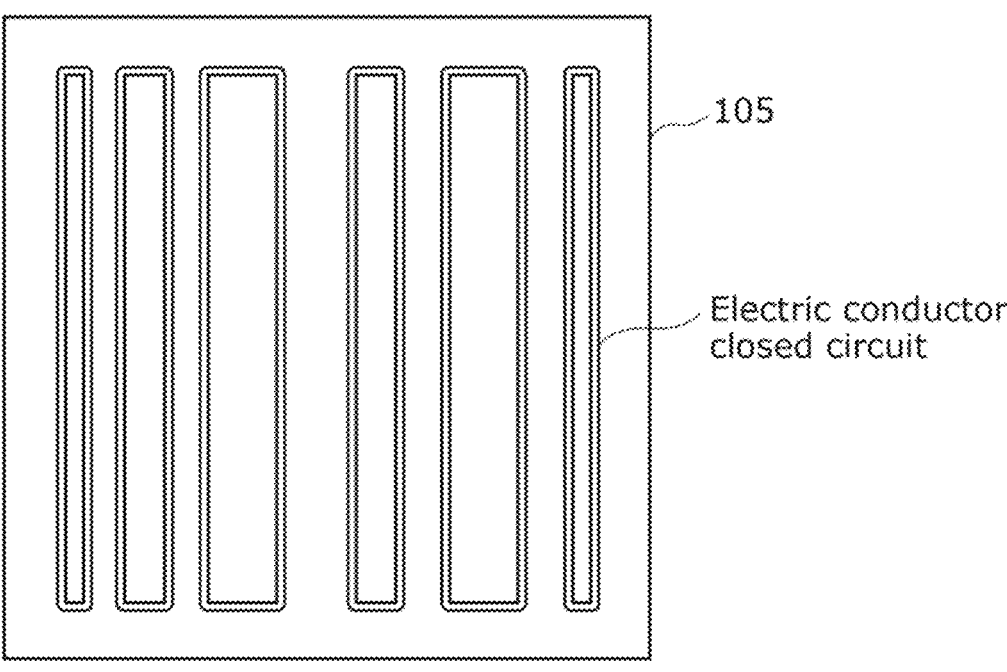
FIG. 27 is a conceptual diagram illustrating an example of an electric conductor corresponding to the first example of a marker according to an embodiment of the present disclosure.

FIG. 27 is a conceptual diagram schematically illustrating an example of the electric conductor corresponding to the example in FIG. 15. For example, in the example illustrated in FIG. 15, a closed circuit of an electric conductor as illustrated in FIG. 27 may be arranged along the outline of the black portion (or white portion).

Figure 28:
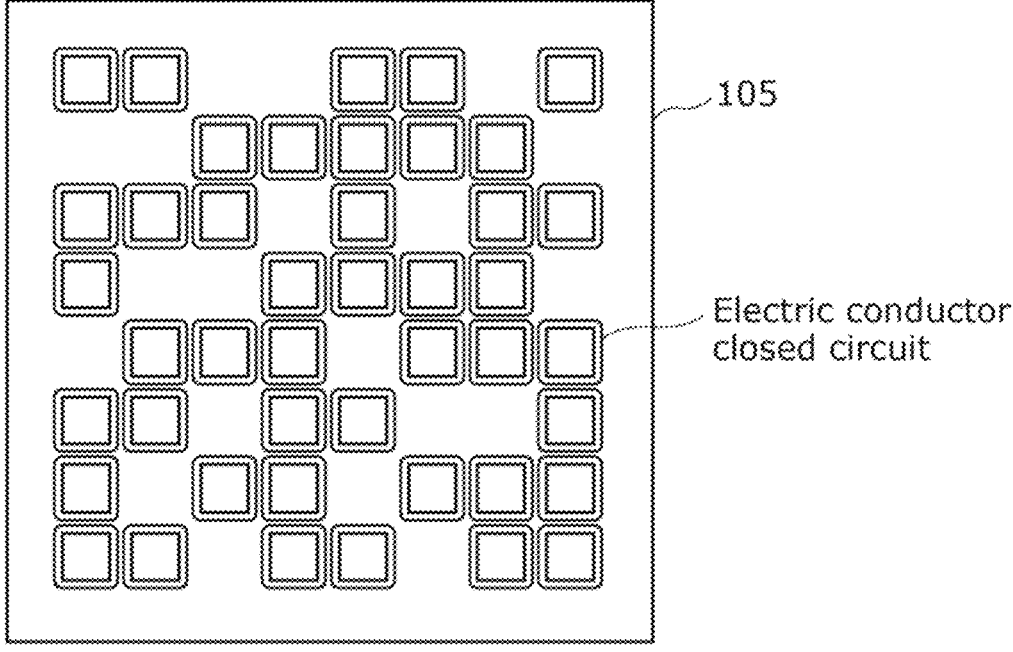
FIG. 28 is a conceptual diagram illustrating an example of an electric conductor corresponding to the second example of a marker according to an embodiment of the present disclosure.

FIG. 28 is a conceptual diagram schematically illustrating an example of the electric conductor corresponding to the example in FIG. 16. For example, in the example illustrated in FIG. 16, a closed circuit of an electric conductor as illustrated in FIG. 28 may be arranged along the outline of the black portion (or white portion).

Figure 29:
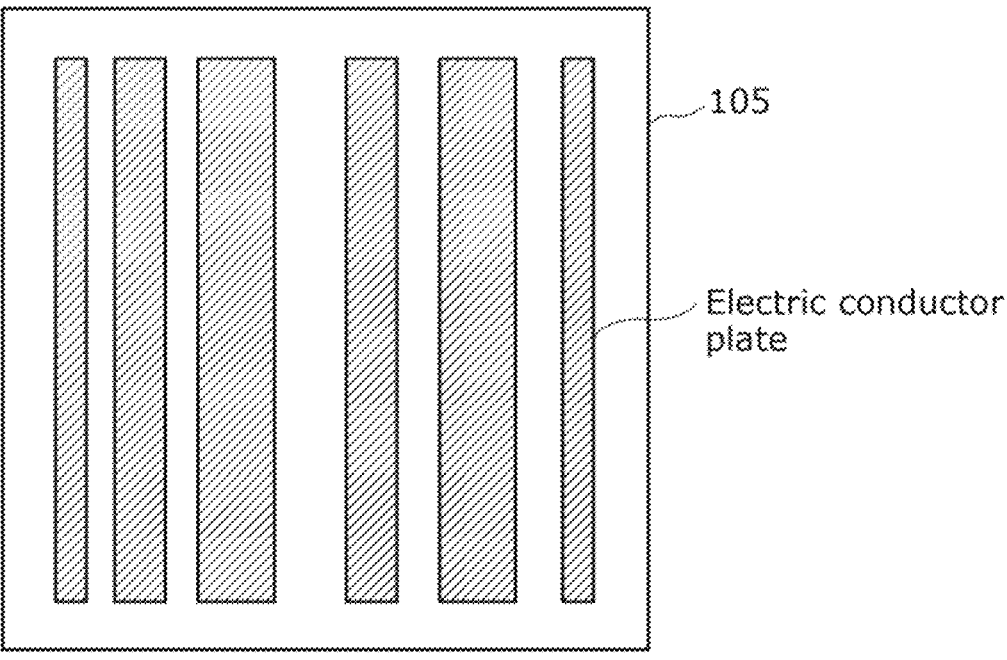
FIG. 29 is a conceptual diagram illustrating another example of an electric conductor corresponding to the first example of a marker according to an embodiment of the present disclosure.

FIG. 29 is a conceptual diagram schematically illustrating another example of the electric conductor corresponding to the example in FIG. 15. For example, in the example illustrated in FIG. 15, a plate of an electric conductor may be arranged in the black portion (or white portion) as illustrated in FIG. 29. Stated differently, instead of an annular electric conductor as illustrated in FIG. 27, a plate-shaped electric conductor may be used. As described above, even when a plate-shaped electric conductor is used, eddy currents are generated in the electric conductor by electromagnetic induction, and a magnetic field component is induced from the electric conductor. As a result, a barcode-like magnetic pattern is formed.

Figure 30:
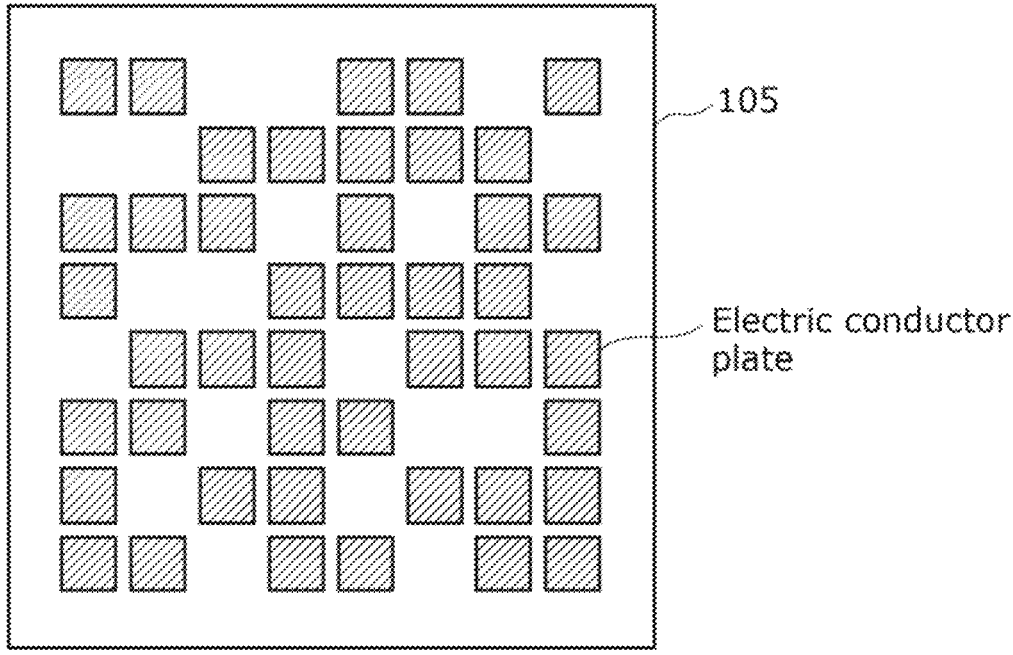
FIG. 30 is a conceptual diagram illustrating another example of an electric conductor corresponding to the second example of a marker according to an embodiment of the present disclosure.

FIG. 30 is a conceptual diagram schematically illustrating another example of the electric conductor corresponding to the example in FIG. 16. For example, in the example illustrated in FIG. 16, a plate of an electric conductor may be arranged in the black portion (or white portion) as illustrated in FIG. 30. Stated differently, instead of an annular electric conductor as illustrated in FIG. 28, a plate-shaped electric conductor may be used. As described above, even when a plate-shaped electric conductor is used, eddy currents are generated in the electric conductor by electromagnetic induction, and a magnetic field component is induced from the electric conductor. As a result, a two-dimensional code-like magnetic pattern is formed.

Instead of the magnetic wire illustrated in FIG. 17 through FIG. 19, a wire-shaped electric conductor may be used. In this case as well, the control and other aspects explained in FIG. 17 through FIG. 19 can be applied.

Instead of the concentric magnetic material that is magnetic illustrated in FIG. 20 through FIG. 22, a concentric electric conductor may be used. In this case as well, the control and other aspects explained in FIG. 20 through FIG. 22 can be applied.

Figure 31:
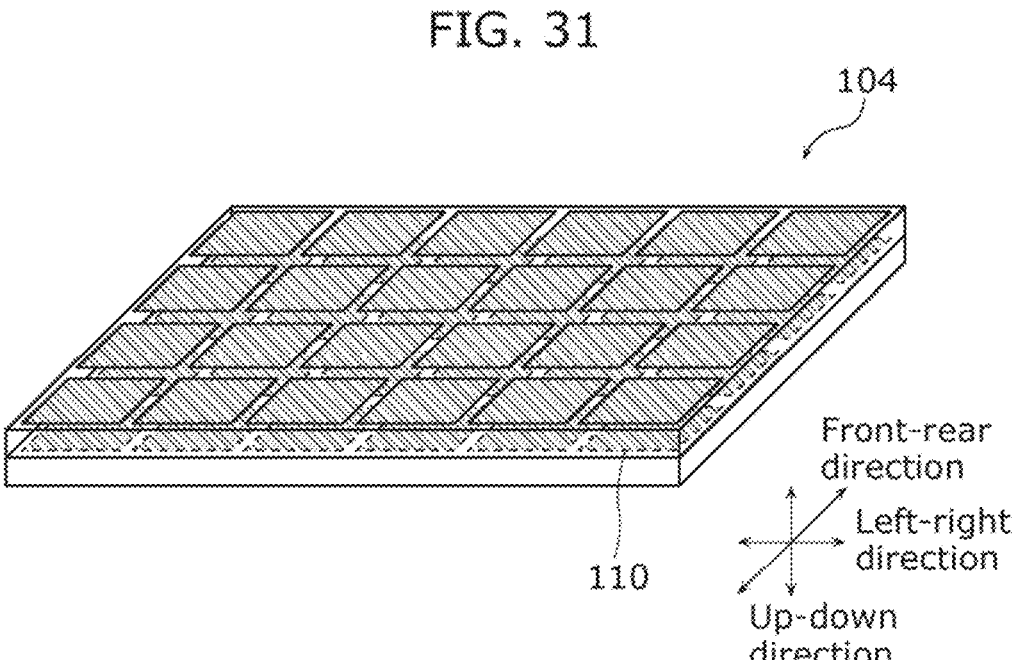
FIG. 31 is a conceptual diagram illustrating a first specific example of a magnetic sensor array according to an embodiment of the present disclosure.

FIG. 31 is a conceptual diagram illustrating a first specific example of magnetic sensor array 104 illustrated in FIG. 1. In this example, the plurality of magnetic sensors 110 of magnetic sensor array 104 are disposed on two planes that are parallel to both the front-rear direction and the left-right direction of vehicle 101, and correspond to two different positions in the up-down direction of vehicle 101. More specifically, in this example, two two-dimensional magnetic sensor arrays are stacked. This makes it possible to obtain a sensing result of magnetism on two planar measurement planes.

Figure 32:
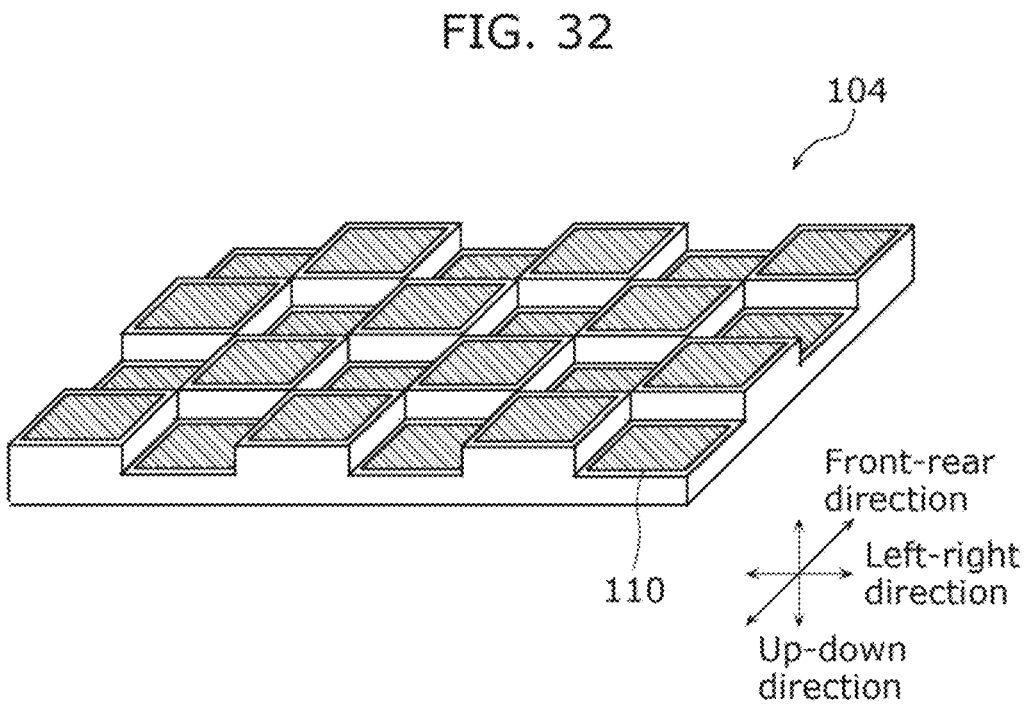
FIG. 32 is a conceptual diagram illustrating a second specific example of a magnetic sensor array according to an embodiment of the present disclosure.

FIG. 32 is a conceptual diagram illustrating a second specific example of magnetic sensor array 104 illustrated in FIG. 1. In this example as well, similar to the example in FIG. 31, the plurality of magnetic sensors 110 of magnetic sensor array 104 are disposed on two planes that are parallel to both the front-rear direction and the left-right direction of vehicle 101, and correspond to two different positions in the up-down direction of vehicle 101. In this example, a plurality of magnetic sensors 110 are arranged alternately on two planes with respect to each of the front-rear direction and the left-right direction of vehicle 101.

This makes it possible to obtain a sensing result of magnetism on two planar measurement planes. In this example, the displacement in the front-rear direction and left-right direction of the plurality of magnetic sensors 110 disposed on the two planes may be ignored. Alternatively, the sensing results may be interpolated by linear interpolation or the like in the front-rear direction and the left-right direction. Alternatively, magnetism may be sensed at corresponding positions across two measurement planes, both in the front-rear and left-right directions by magnetic sensor array 104 moving as vehicle 101 moves.

Figure 33:
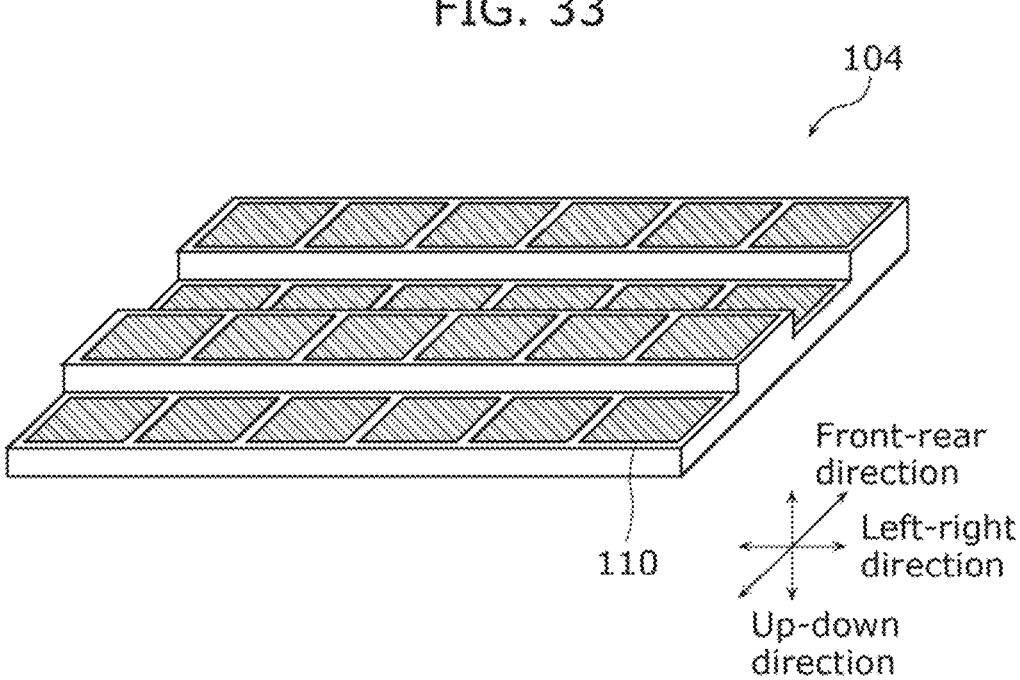
FIG. 33 is a conceptual diagram illustrating a third specific example of a magnetic sensor array according to an embodiment of the present disclosure.

FIG. 33 is a conceptual diagram illustrating a third specific example of magnetic sensor array 104 illustrated in FIG. 1. In this example as well, similar to the example in FIG. 31, the plurality of magnetic sensors 110 of magnetic sensor array 104 are disposed on two planes that are parallel to both the front-rear direction and the left-right direction of vehicle 101, and correspond to two different positions in the up-down direction of vehicle 101. In this example, a plurality of magnetic sensors 110 are arranged alternately on two planes with respect to the front-rear direction of vehicle 101.

This makes it possible to obtain a sensing result of magnetism on two planar measurement planes. In this example, the displacement in the front-rear direction of the plurality of magnetic sensors 110 disposed on the two planes may be ignored. Alternatively, the sensing results may be interpolated by linear interpolation or the like in the front-rear direction. Alternatively, magnetism may be sensed at corresponding positions across two measurement planes, both in the front-rear and left-right directions by magnetic sensor array 104 moving as vehicle 101 moves.

Note that in this example, a plurality of magnetic sensors 110 are arranged alternately on two planes with respect to the front-rear direction of vehicle 101, but a plurality of magnetic sensors 110 may be arranged alternately on two planes with respect to the left-right direction of vehicle 101. In this case as well, it is possible to obtain a sensing result of magnetism on two planar measurement planes. In this case, the displacement in the left-right direction of the plurality of magnetic sensors 110 disposed on the two planes may be ignored. Alternatively, the sensing results may be interpolated by linear interpolation or the like in the left-right direction.

Figure 34:
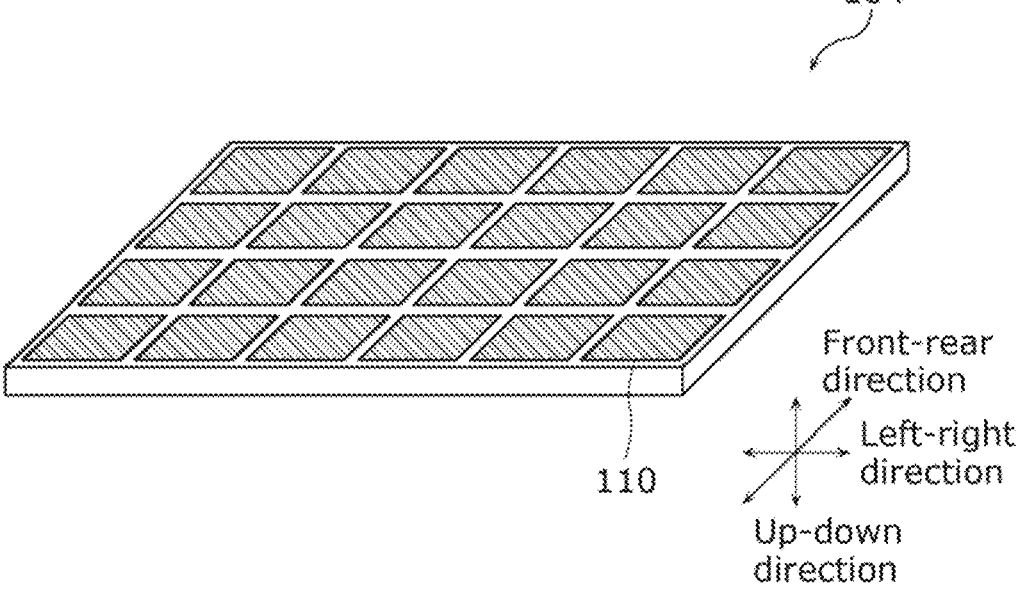
FIG. 34 is a conceptual diagram illustrating a fourth specific example of a magnetic sensor array according to an embodiment of the present disclosure.

FIG. 34 is a conceptual diagram illustrating a fourth specific example of magnetic sensor array 104 illustrated in FIG. 1. In this example, the plurality of magnetic sensors 110 of magnetic sensor array 104 are disposed on one plane that is parallel to both the front-rear direction and the left-right direction of vehicle 101. More specifically, in this example, one two-dimensional magnetic sensor array is used. This makes it possible to obtain a sensing result of magnetism on a single planar measurement plane.

Note that magnetic sensor array 104 in this example may sense magnetism in two measurement planes by vibrating in the up-down direction of vehicle 101. An actuator for vibrating magnetic sensor array 104 in the up-down direction of vehicle 101 may be equipped on vehicle 101. Autonomous driving control system 102 may include such an actuator.

Figure 35:
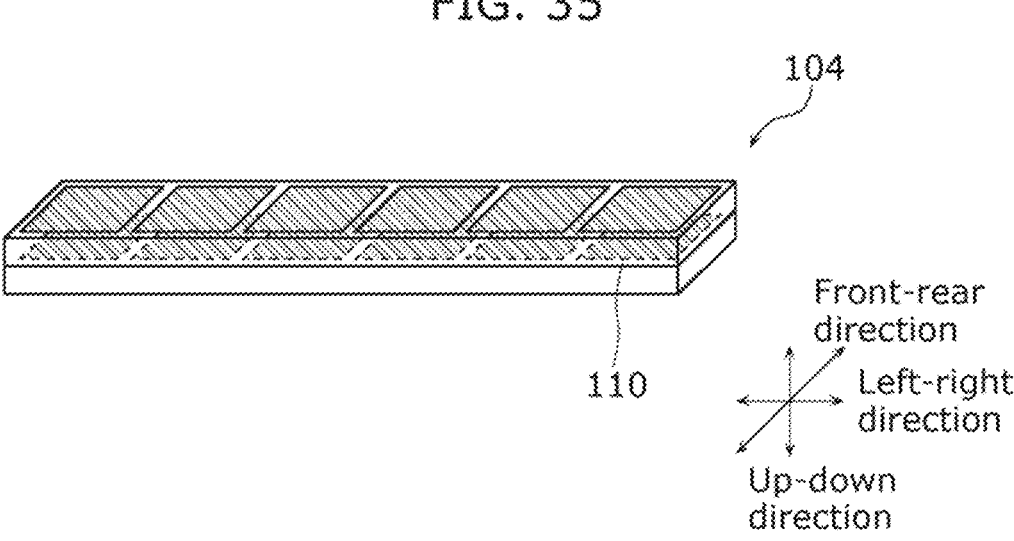
FIG. 35 is a conceptual diagram illustrating a fifth specific example of a magnetic sensor array according to an embodiment of the present disclosure.

FIG. 35 is a conceptual diagram illustrating a fifth specific example of magnetic sensor array 104 illustrated in FIG. 1. In this example, the plurality of magnetic sensors 110 of magnetic sensor array 104 are disposed on two straight lines that are parallel to the left-right direction of vehicle 101 and correspond to two different positions in the up-down direction of vehicle 101. In this example, the two straight lines on which the plurality of magnetic sensors 110 are disposed correspond to the same single position in the front-rear direction of vehicle 101. More specifically, two one-dimensional magnetic sensor arrays are stacked.

As vehicle 101 moves in the front-rear direction, the plurality of magnetic sensors 110 also move. This makes it possible to obtain a sensing result of magnetism on two measurement planes corresponding to two different positions in the up-down direction of vehicle 101.

Figure 36:
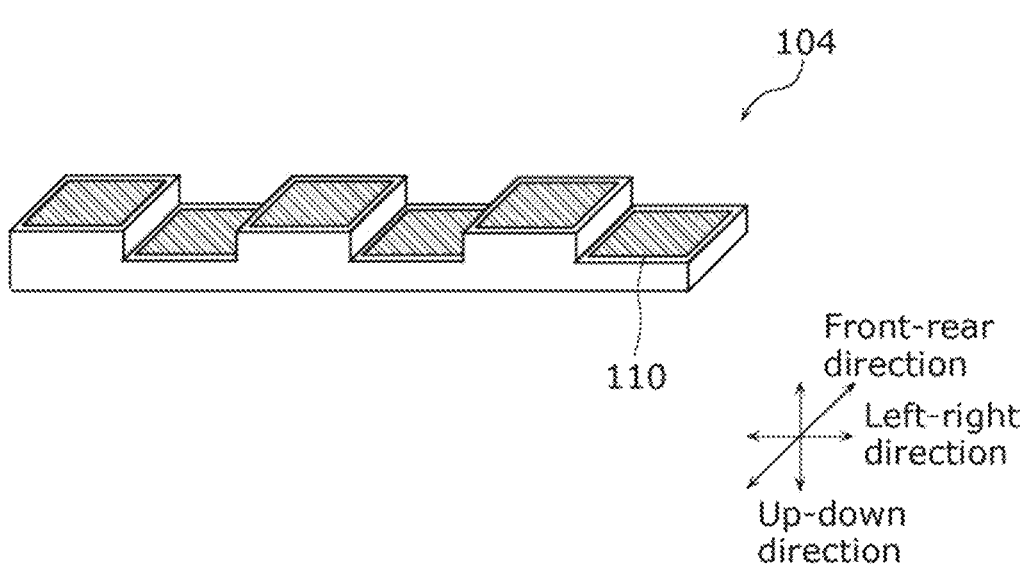
FIG. 36 is a conceptual diagram illustrating a sixth specific example of a magnetic sensor array according to an embodiment of the present disclosure.

FIG. 36 is a conceptual diagram illustrating a sixth specific example of magnetic sensor array 104 illustrated in FIG. 1. In this example as well, the plurality of magnetic sensors 110 of magnetic sensor array 104 are disposed on two straight lines that are parallel to the left-right direction of vehicle 101 and correspond to two different positions in the up-down direction of vehicle 101. In this example as well, the two straight lines on which the plurality of magnetic sensors 110 are disposed correspond to the same single position in the front-rear direction of vehicle 101.

In this example, a plurality of magnetic sensors 110 are arranged alternately on two straight lines with respect to the left-right direction of vehicle 101. As vehicle 101 moves in the front-rear direction, the plurality of magnetic sensors 110 also move. This makes it possible to obtain a sensing result of magnetism on two measurement planes corresponding to two different positions in the up-down direction of vehicle 101.

In this example, the displacement in the left-right direction of the plurality of magnetic sensors 110 disposed on the two straight lines may be ignored. Alternatively, the sensing results may be interpolated by linear interpolation or the like in the left-right direction.

Figure 37:
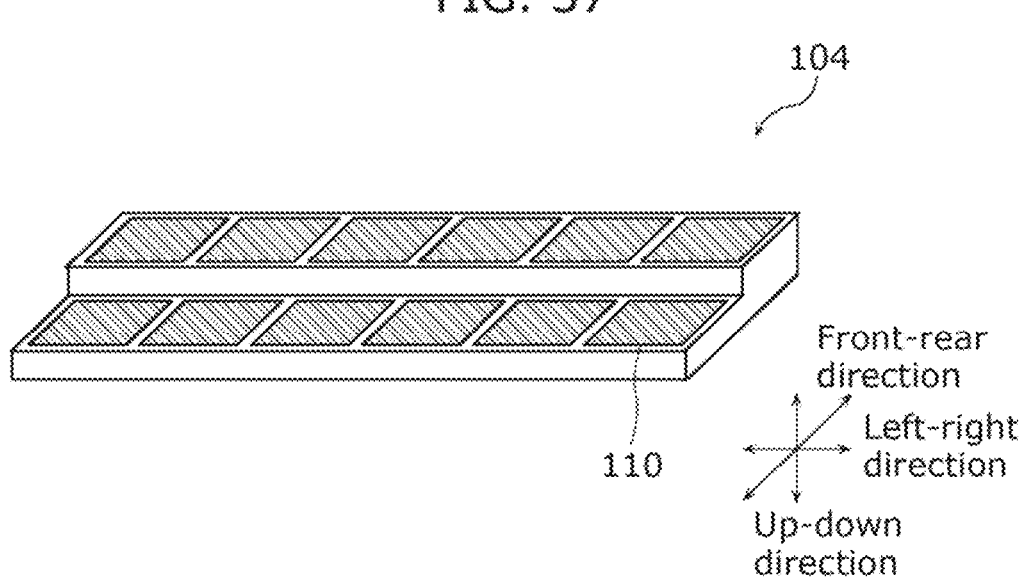
FIG. 37 is a conceptual diagram illustrating a seventh specific example of a magnetic sensor array according to an embodiment of the present disclosure.

FIG. 37 is a conceptual diagram illustrating a seventh specific example of magnetic sensor array 104 illustrated in FIG. 1. In this example as well, the plurality of magnetic sensors 110 of magnetic sensor array 104 are disposed on two straight lines that are parallel to the left-right direction of vehicle 101 and correspond to two different positions in the up-down direction of vehicle 101.

In this example, the two straight lines on which the plurality of magnetic sensors 110 are disposed correspond to two different positions in the front-rear direction of vehicle 101. As vehicle 101 moves in the front-rear direction, the plurality of magnetic sensors 110 also move. This makes it possible to obtain a sensing result of magnetism on two measurement planes corresponding to two different positions in the up-down direction of vehicle 101.

In this example, the displacement in the front-rear direction of the plurality of magnetic sensors 110 disposed on the two straight lines may be ignored. Alternatively, magnetism may be sensed at corresponding positions across two measurement planes, both in the front-rear and left-right direction by magnetic sensor array 104 moving as vehicle 101 moves.

Figure 38:
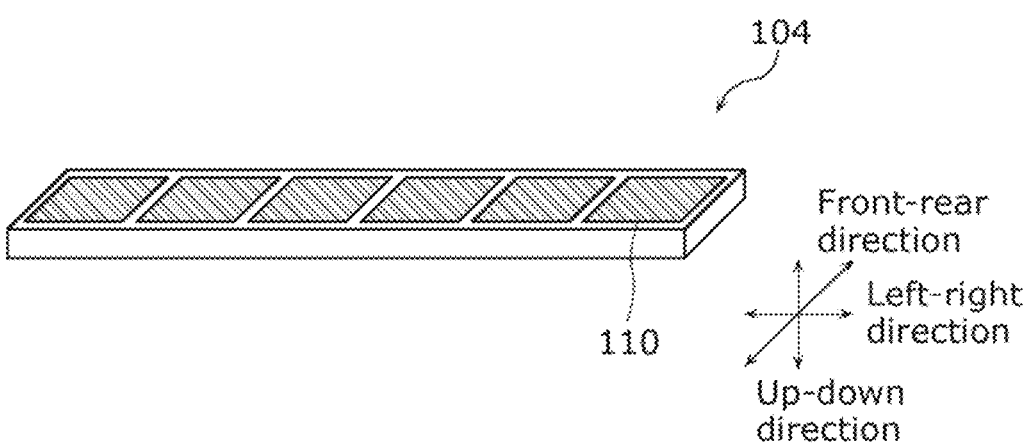
FIG. 38 is a conceptual diagram illustrating an eighth specific example of a magnetic sensor array according to an embodiment of the present disclosure.

FIG. 38 is a conceptual diagram illustrating an eighth specific example of magnetic sensor array 104 illustrated in FIG. 1. In this example, the plurality of magnetic sensors 110 of magnetic sensor array 104 are disposed on one straight line that is parallel to the left-right direction of vehicle 101. More specifically, in this example, one one-dimensional magnetic sensor array is used. As vehicle 101 moves in the front-rear direction, the plurality of magnetic sensors 110 also move. This makes it possible to obtain a sensing result of magnetism on one measurement plane corresponding to one position in the up-down direction of vehicle 101.

Note that magnetic sensor array 104 in this example may sense magnetism in two measurement planes by vibrating in the up-down direction of vehicle 101. An actuator for vibrating magnetic sensor array 104 in the up-down direction of vehicle 101 may be equipped on vehicle 101. Autonomous driving control system 102 may include such an actuator.

In FIG. 31 through FIG. 38, the up-down direction in each figure corresponds to the up-down direction of vehicle 101, but the up-down direction may be inverted so that magnetic sensor 110 is installed facing downward. In FIG. 31 through FIG. 38, a plurality of magnetic sensors 110 are schematically illustrated, but the configuration of the plurality of magnetic sensors 110 is not limited to the examples illustrated in FIG. 31 through FIG. 38. In particular, the number of the plurality of magnetic sensors 110 is not limited to the number illustrated in FIG. 31 through FIG. 38.

Each magnetic sensor array 104 illustrated in FIG. 31 through FIG. 33 may be considered as a combination of two two-dimensional magnetic sensor arrays arranged in the front-rear direction and the left-right direction of vehicle 101. These two two-dimensional magnetic sensor arrays are disposed at two different positions from each other in the up-down direction of vehicle 101.

Each magnetic sensor array 104 illustrated in FIG. 35 through FIG. 37 may be considered as a combination of two one-dimensional magnetic sensor arrays arranged in the left-right direction of vehicle 101. These two one-dimensional magnetic sensor arrays are disposed at two different positions from each other in the up-down direction of vehicle 101.

Figure 39:
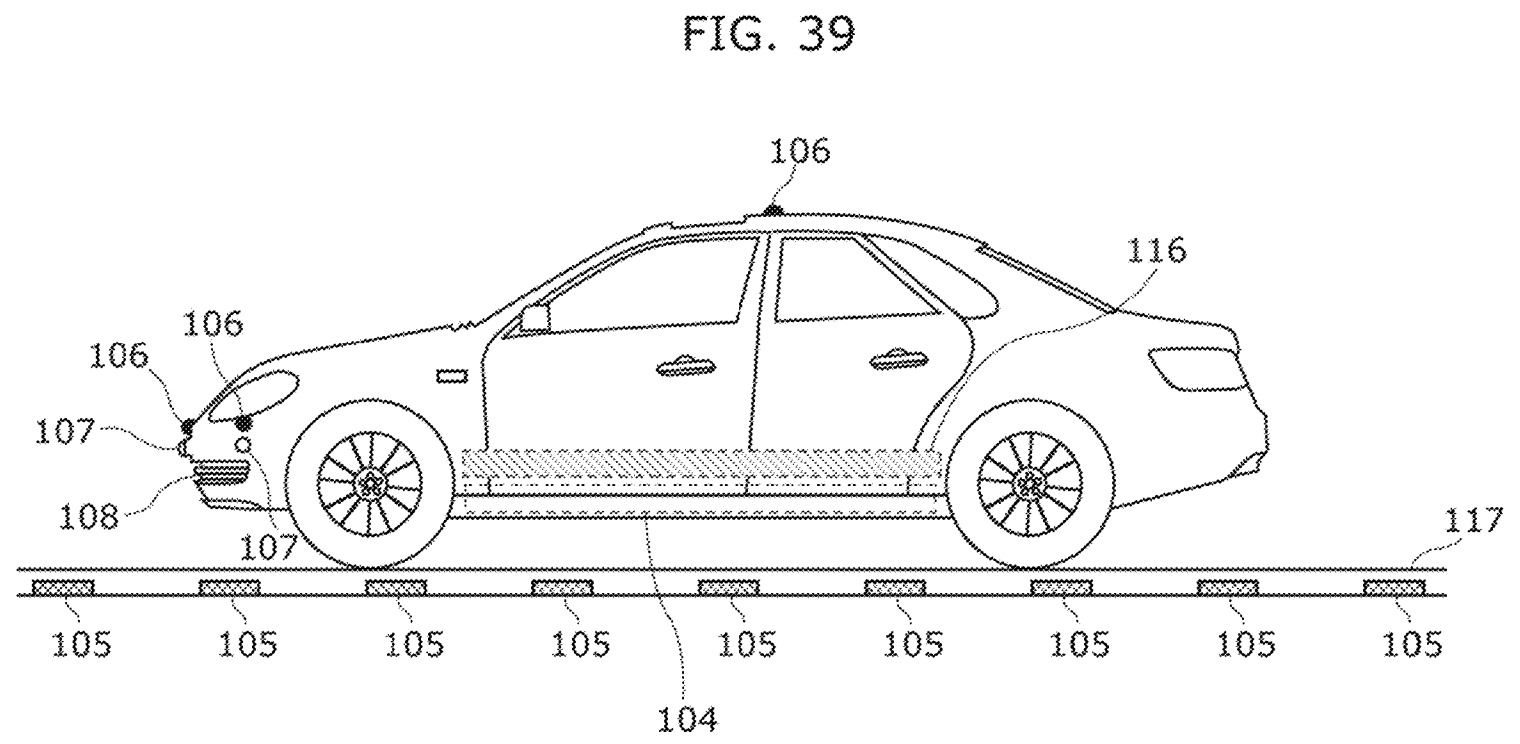

FIG. 39 is a conceptual diagram illustrating a magnetic shield equipped on vehicle 101. In a case in which magnetic sensor array 104 does not sense magnetism in the two measurement planes but senses magnetism in one measurement plane, information processing circuit 103 generates the reconstruction image using the above-mentioned Equation (5). However, in this case, there is a possibility that the reconstruction image may not be appropriately generated due to a magnetic noise source above magnetic sensor array 104.

In view of this, as illustrated in FIG. 39, magnetic shield 116 may be provided above magnetic sensor array 104. For example, magnetic shield 116 is made of permalloy, which has a high magnetic permeability. Magnetic shield 116 makes it difficult for magnetism to reach magnetic sensor array 104, which is below magnetic shield 116, from a magnetic noise source above magnetic shield 116. This enables the reconstruction image to be appropriately generated even when a magnetic noise source exists above magnetic sensor array 104.

Magnetic shield 116 is particularly effective in cases in which magnetic sensor array 104 does not sense magnetism in the two measurement planes but senses magnetism in one measurement plane. However, magnetic shield 116 may be used even in cases where magnetic sensor array 104 senses magnetism in the two measurement planes. Autonomous driving control system 102 may include such magnetic shield 116.

Figure 40:
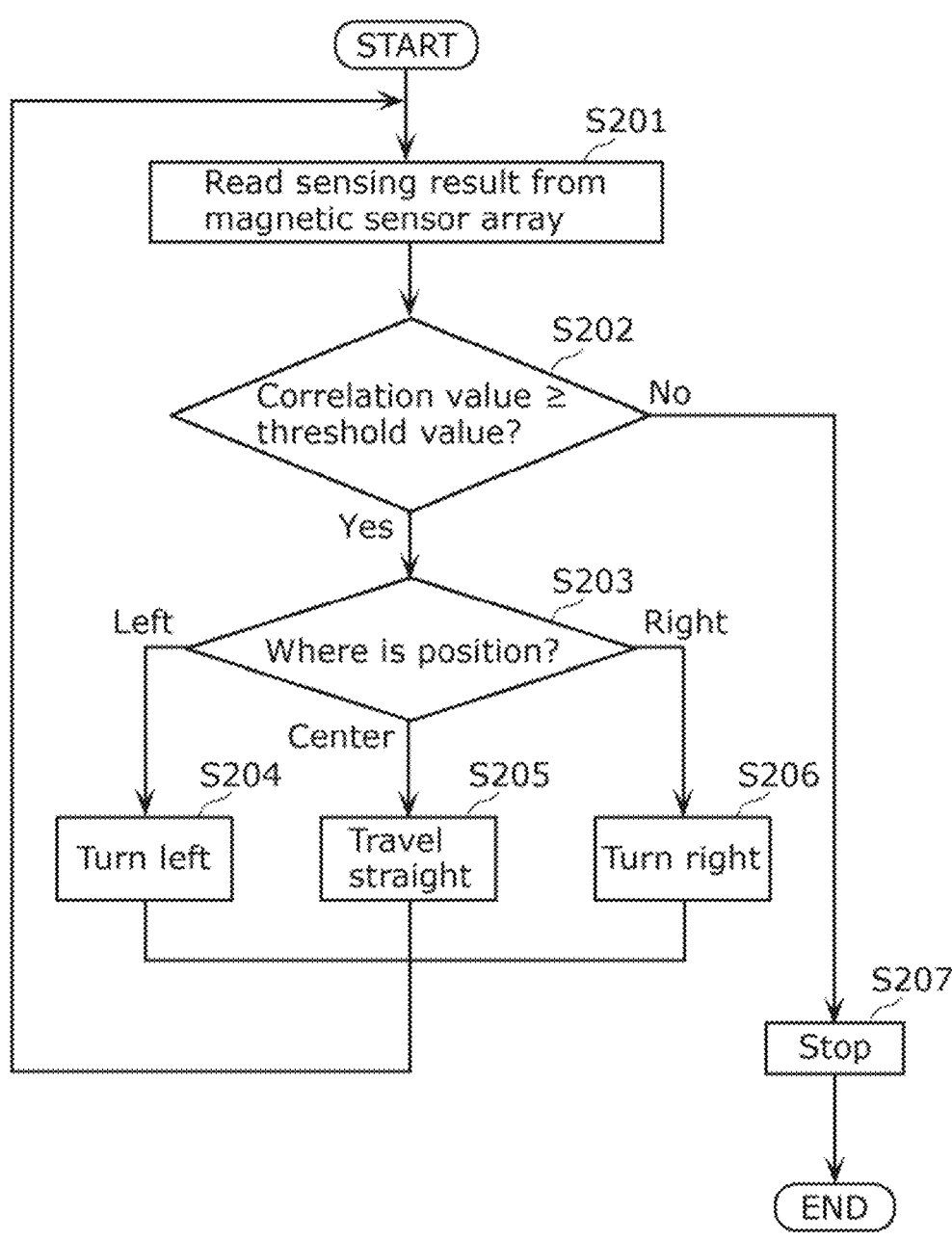
FIG. 40 is a flowchart illustrating a travel control process according to an embodiment of the present disclosure.

FIG. 40 is a flowchart illustrating the travel control process performed by information processing circuit 103. For example, information processing circuit 103 reads a sensing result of magnetism from magnetic sensor array 104 (S201).

Next, information processing circuit 103 generates a reconstruction image in a region close to the estimated position of marker 105, according to the sensing result of magnetism and the fundamental equation of the steady magnetic field and the quasi-steady magnetic field. Information processing circuit 103 then performs correlation between the magnetic patterns prepared in memory and the reconstruction image, and determines whether the correlation value is greater than or equal to a threshold value (S202). If the correlation value is less than the threshold value (No in S202), it is assumed that the magnetism of marker 105 has not been sensed. In such cases, information processing circuit 103 stops vehicle 101 (S207).

If the correlation value is greater than or equal to the threshold value (Yes in S202), it is assumed that the magnetism of marker 105 has been sensed. In such cases, information processing circuit 103 determines where the position corresponding to the correlation value greater than or equal to the threshold value is (S203). Stated differently, information processing circuit 103 determines where the position of the portion in the reconstruction image that yields a correlation value greater than or equal to the threshold value is with respect to the magnetic pattern prepared in memory.

If the position corresponding to the correlation value greater than or equal to the threshold value is the left position, information processing circuit 103 causes vehicle 101 to turn left (S204). If the position corresponding to the correlation value greater than or equal to the threshold value is the center position, information processing circuit 103 causes vehicle 101 to travel straight (S205). If the position corresponding to the correlation value greater than or equal to the threshold value is the right position, information processing circuit 103 causes vehicle 101 to turn right (S206).

Information processing circuit 103 repeats the above-described processing (i.e., the processing from S201 to S207). This enables information processing circuit 103 to control the travel of vehicle 101 according to the reconstruction image.

The above-described travel control process is only one example, and various modifications may be made thereto. For example, the sensing result may be read in advance in a steady magnetic field or a quasi-steady magnetic field. In subsequent operations, a difference from the sensing result of magnetism in the steady magnetic field may be used. With this, the effects of individual differences among the plurality of magnetic sensors 110 and the effects of environmental magnetic fields can be inhibited.

Information processing circuit 103 may control the curvature for causing vehicle 101 to turn left or right according to the position corresponding to the correlation value greater than or equal to the threshold value. For example, information processing circuit 103 may increase the curvature as the position corresponding to the correlation value greater than or equal to the threshold value deviates further from the center. This enables information processing circuit 103 to drive vehicle 101 along various curves.

Information processing circuit 103 may control the travel of vehicle 101 via P control (proportional control). Information processing circuit 103 may use I control (integral control) in curves to drive vehicle 101 smoothly along the curves.

Next, a basic experiment related to the present embodiment will be described with reference to FIG. 41 through FIG. 44. In this basic experiment, a reconstruction image is generated from a measurement image.

Figure 41:
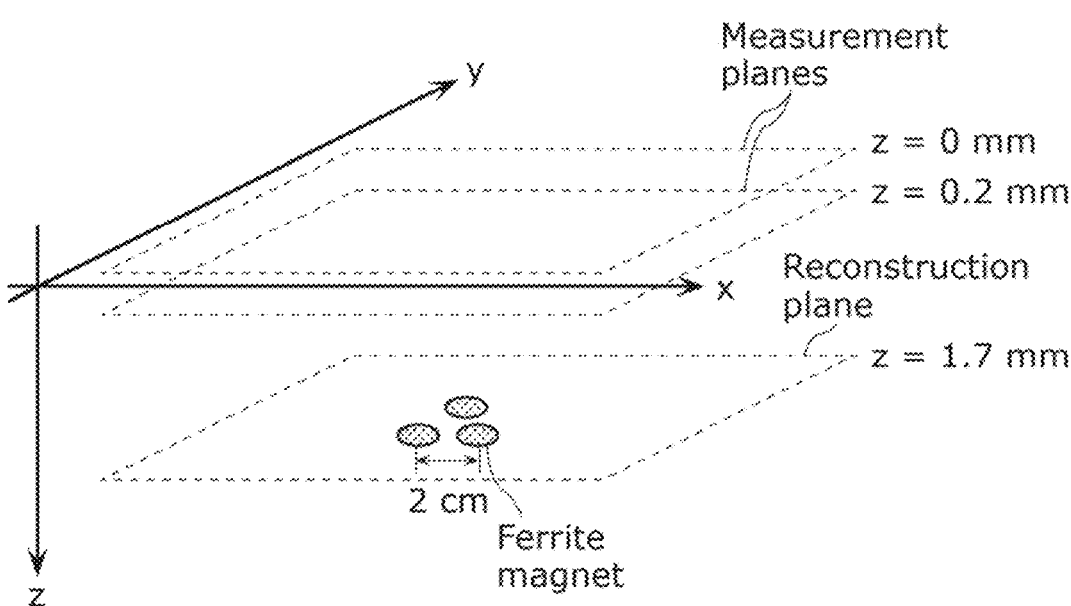
FIG. 41 is a conceptual diagram illustrating a basic experiment according to an embodiment of the present disclosure.

FIG. 41 is a conceptual diagram of a basic experiment (an experiment with a reduced scale). FIG. 41 expresses two measurement planes and a reconstruction plane in an xyz orthogonal coordinate system.

z is a coordinate value in the z-direction from the measurement planes toward the magnetic source, x is a coordinate value in the x-direction orthogonal to the z-direction, and y is a coordinate value in the y-direction orthogonal to the z-direction and the x-direction.

The magnetic source includes three ferrite magnets arranged at 2 cm intervals. The reconstruction plane is z=1.7 mm, which corresponds to the position where the magnetic source is. The two measurement planes are z=0 mm and z=0.2 mm, and the magnetic field is sensed at the two measurement planes.

Figure 42:
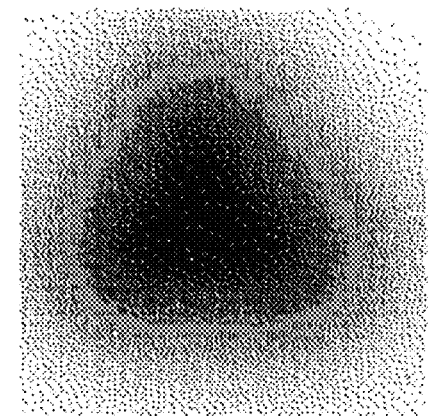
FIG. 42 shows a first measurement image obtained in a basic experiment according to an embodiment of the present disclosure.

FIG. 42 shows a first measurement image obtained in a basic experiment (an experiment with a reduced scale). More specifically, FIG. 42 illustrates a first measurement image corresponding to the sensing result of magnetism at the measurement plane at z=0 mm.

Figure 43:
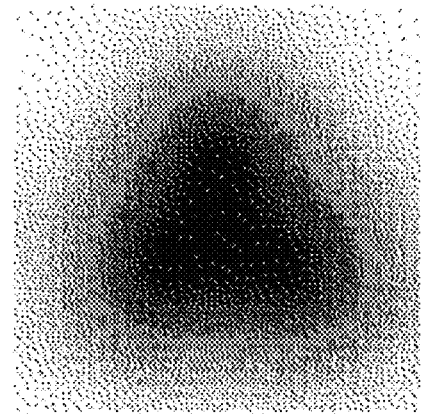
FIG. 43 shows a second measurement image obtained in a basic experiment according to an embodiment of the present disclosure.

FIG. 43 shows a second measurement image obtained in a basic experiment (an experiment with a reduced scale). More specifically, FIG. 43 illustrates a second measurement image corresponding to the sensing result of magnetism at the measurement plane at z=0.2 mm.

Figure 44:
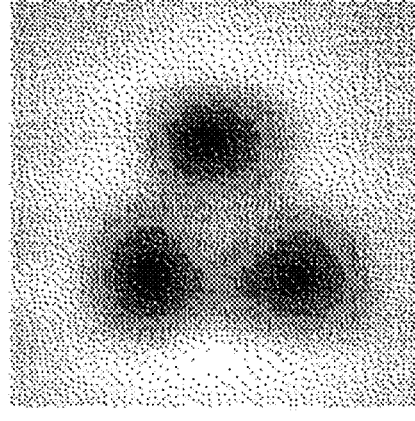
FIG. 44 shows a reconstruction image obtained in a basic experiment according to an embodiment of the present disclosure.

FIG. 44 shows a reconstruction image obtained in a basic experiment (an experiment with a reduced scale). More specifically, FIG. 44 illustrates a reconstruction image showing the magnetic field at the reconstruction plane at z=1.7 mm. This reconstruction image is generated using Equation (9).

In the first measurement image and the second measurement image illustrated in FIG. 42 and FIG. 43, it is difficult to identify the presence of the three ferrite magnets. However, in the reconstruction image illustrated in FIG. 44, it is possible to identify the presence of the three ferrite magnets. Stated differently, in the reduced-scale experiment, it was demonstrated that the reconstruction image can appropriately show the magnetic field in a region closer to the magnetic source than the measurement plane. Autonomous driving control system 102 can appropriately identify marker 105 by using such a reconstruction image, and can appropriately control the travel of vehicle 101.

Next, verification related to the present embodiment will be described with reference to FIG. 45 through FIG. 48. This verification is a comparative verification between control based on the measurement image and control based on the reconstruction image.

Figure 45:
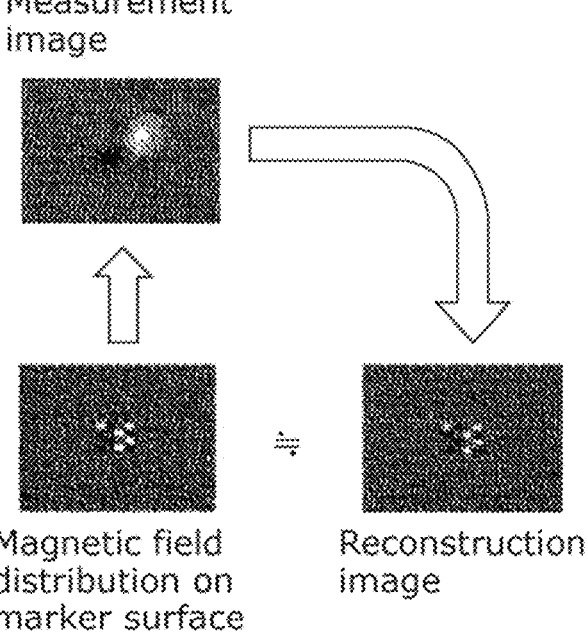
FIG. 45 is a conceptual diagram illustrating the relationship between a measurement image and a reconstruction image for verification according to an embodiment of the present disclosure.

FIG. 45 is a conceptual diagram illustrating the relationship between a measurement image and a reconstruction image for verification. More specifically, FIG. 45 illustrates the magnetic field distribution on the surface of marker 105, the measurement image showing the sensing result of magnetism in magnetic sensor array 104, and the reconstruction image obtained as an image showing the magnetic field in a region close to marker 105 generated by information processing circuit 103.

The measurement image corresponds to the sensing result of magnetism in magnetic sensor array 104 spaced from marker 105, and therefore deviates from the magnetic field distribution on the surface of marker 105. However, the reconstruction image is an image obtained according to fundamental equation of steady magnetic fields and quasi-steady magnetic fields, and shows the magnetic field in a region close to marker 105 on the road where marker 105 is provided. Therefore, it approximates the magnetic field distribution on the surface of marker 105. Stated differently, the reconstruction image appropriately shows the magnetic pattern of marker 105.

Therefore, it is assumed that autonomous driving control system 102 can more appropriately control the travel of vehicle 101 by using the reconstruction image rather than using the measurement image.

For comparative verification between control based on the measurement image and control based on the reconstruction image, a prototype model of vehicle 101 equipped with autonomous driving control system 102, and a plurality of markers 105 are used in an indoor environment. In the indoor environment, a plurality of tracking target markers, each being marker 105 implemented as a tracking target, and a plurality of dummy markers, each being marker 105 implemented as a dummy marker, are arranged.

For both control based on the measurement image and control based on the reconstruction image, it is verified whether vehicle 101 can continuously track only the plurality of tracking target markers among the plurality of markers 105.

Figures 46, 47:
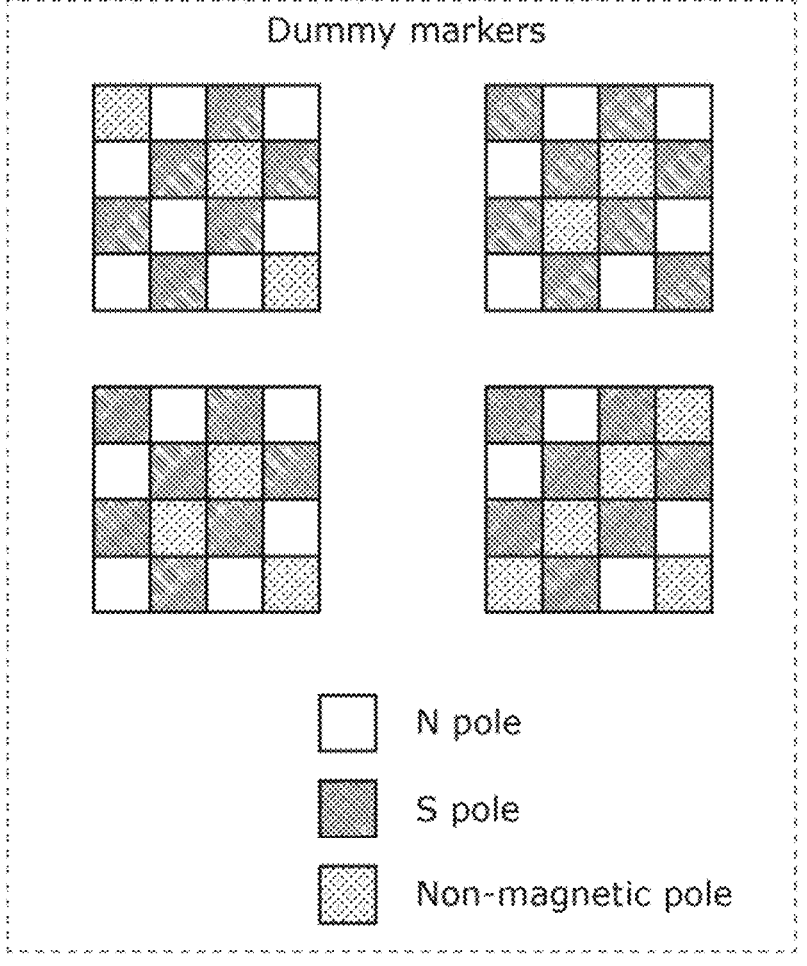
FIG. 46 is a conceptual diagram illustrating a tracking target marker for verification according to an embodiment of the present disclosure.
FIG. 47 is a conceptual diagram illustrating dummy markers for verification according to an embodiment of the present disclosure.

FIG. 46 is a conceptual diagram illustrating a tracking target marker. The tracking target marker has a two-dimensional code-like magnetic pattern. Stated differently, the tracking target marker has a matrix-like magnetic pattern, and each of the plurality of sections included in the magnetic pattern corresponds to an N pole, an S pole, or a non-magnetic pole that is neither an N pole nor an S pole.

FIG. 47 is a conceptual diagram illustrating dummy markers. As illustrated in FIG. 47, four types of dummy markers are used for verification.

The dummy marker, similar to the tracking target marker, has a matrix-like magnetic pattern, and each of the plurality of sections included in the magnetic pattern corresponds to an N pole, an S pole, or a non-magnetic pole. The four types of dummy markers have four mutually different types of magnetic patterns. The four types of magnetic patterns of the four types of dummy markers are also different from the magnetic pattern of the tracking target marker.

Figure 48:
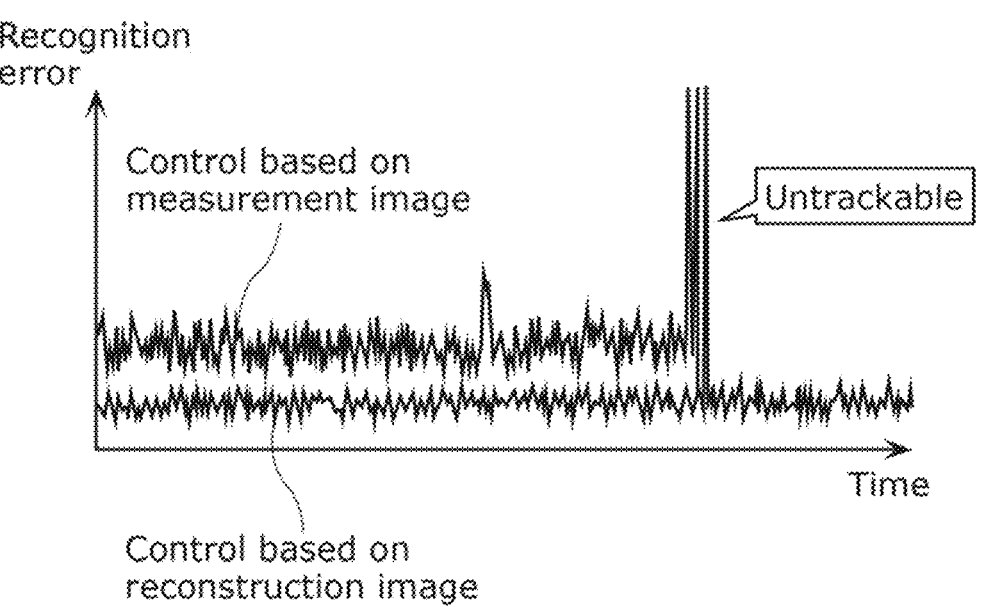
FIG. 48 is a graph illustrating verification results according to an embodiment of the present disclosure.

FIG. 48 is a graph illustrating comparative verification results between control based on the measurement image and control based on the reconstruction image. In FIG. 48, the recognition error is the difference between the position of the tracking target marker recognized by autonomous driving control system 102 and the actual position of the tracking target marker. In control based on the measurement image, the recognition error is relatively large, and vehicle 101 becomes unable to track the tracking target marker partway through. However, in control based on the reconstruction image, the recognition error is relatively small, and vehicle 101 is able to continuously track the tracking target marker until the end.

Stated differently, autonomous driving control system 102 can more appropriately control the travel of vehicle 101 by using the reconstruction image rather than using the measurement image.

As described above, autonomous driving control system 102 of vehicle 101 that travels on road provided with markers 105 includes magnetic sensor array 104 and information processing circuit 103. Magnetic sensor array 104 is equipped on vehicle 101 and senses magnetism. Information processing circuit 103 generates an image showing the magnetic field in a region closer to marker 105 than magnetic sensor array 104, according to the sensing result of magnetism and the fundamental equation of the steady magnetic field and the quasi-steady magnetic field. Information processing circuit 103 controls the travel of vehicle 101 in accordance with the image.

This enables autonomous driving control system 102 to control the travel of vehicle 101 according to an image showing the magnetic field in a region closer to marker 105 than magnetic sensor array 104. This image is assumed to show marker 105 with high accuracy. It is therefore assumed that marker 105 can be appropriately identified. Therefore, autonomous driving control system 102 can appropriately control the travel of vehicle 101 according to marker 105.

For example, information processing circuit 103 may obtain the speed of vehicle 101. Information processing circuit 103 may convert temporal changes in the sensing result into spatial changes according to the speed. Information processing circuit 103 may generate an image showing the magnetic field according to the fundamental equation and the sensing result in which the temporal changes have been converted into the spatial changes.

Accordingly, autonomous driving control system 102 can sufficiently obtain the spatial change of the magnetic field according to the temporal changes in sensing results and the speed of vehicle 101. Therefore, autonomous driving control system 102 can adequately generate an image showing the magnetic field.

For example, magnetic sensor array 104 may include one or more two-dimensional magnetic sensor arrays arranged in the front-rear direction and the left-right direction of vehicle 101. Accordingly, autonomous driving control system 102 can sufficiently obtain the spatial change of the magnetic field with a two-dimensional magnetic sensor array. Therefore, autonomous driving control system 102 can adequately generate an image showing the magnetic field.

For example, magnetic sensor array 104 may include one or more one-dimensional magnetic sensor arrays arranged in the left-right direction of vehicle 101. This enables autonomous driving control system 102 to appropriately control the travel of vehicle 101 with few resources and at low cost.

For example, magnetic sensor array 104 may sense magnetism in one layer arranged in the front-rear direction and the left-right direction of vehicle 101. This enables autonomous driving control system 102 to sense magnetism in a simple manner and perform processing with a low computational load.

For example, magnetic sensor array 104 may sense magnetism in two layers arranged in the front-rear direction and the left-right direction of vehicle 101. This enables autonomous driving control system 102 to appropriately obtain the gradient of the magnetic field in the up-down direction and adequately generate an image showing the magnetic field.

For example, information processing circuit 103 may generate the image according to the above Equation (5) as an arithmetic expression which is in accordance with the sensing result and the fundamental equation.

In Equation (5) above, $H_i(x, y, z)$ represents the i component of the magnetic field at coordinate position $(x, y, z)$. i indicates x, y, or z. z is a coordinate value in the z-direction from the top of vehicle 101 toward bottom. x is a coordinate value in the x-direction orthogonal to the z-direction. y is a coordinate value in the y-direction orthogonal to the z-direction and the x-direction.

$f(k_x, k_y)$ represents the two-dimensional Fourier transform image of $H_i(x, y, 0)$. $H_i(x, y, 0)$ represents the sensing result at the measurement plane $(x, y, 0)$. $k_x$ is a wavenumber with respect to x. $k_y$ is a wavenumber with respect to y.

This enables autonomous driving control system 102 to adequately generate an image showing the magnetic field in a region closer to marker 105 than magnetic sensor array 104, using the sensing result.

For example, information processing circuit 103 may generate the image according to the above Equation (9) as an arithmetic expression which is in accordance with the sensing result and the fundamental equation.

In Equation (9) above, $H_i(x, y, z)$ represents the i component of the magnetic field at coordinate position $(x, y, z)$. i indicates x, y, or z. z is a coordinate value in the z-direction from the top of vehicle 101 toward bottom. x is a coordinate value in the x-direction orthogonal to the z-direction. y is a coordinate value in the y-direction orthogonal to the z-direction and the x-direction.

$f(k_x, k_y)$ represents the two-dimensional Fourier transform image of $H_i(x, y, 0)$. $H_i(x, y, 0)$ represents the sensing result at the measurement plane $(x, y, 0)$. $g(k_x, k_y)$ represents the two-dimensional Fourier transform image of $\partial/\partial z H_i(x, y, z)|_{z=0}$. $\partial/\partial z H_i(x, y, z)|_{z=0}$ represents the gradient in the z-direction of the sensing result at the measurement plane $(x, y, 0)$. $k_x$ is a wavenumber with respect to x. $k_y$ is a wavenumber with respect to y.

This enables autonomous driving control system 102 to adequately generate an image showing the magnetic field in a region closer to marker 105 than magnetic sensor array 104, using the sensing result and its gradient.

For example, autonomous driving control system 102 may further include at least one of a camera, a LIDAR, a millimeter-wave radar, an ultrasonic sonar, or a GPS receiver. Here, the at least one of the camera, the LiDAR, the millimeter-wave radar, the ultrasonic sonar, or the GPS receiver is equipped on vehicle 101. Information processing circuit 103 may further control the travel of vehicle 101 according to the at least one of the camera, the LiDAR, the millimeter-wave radar, the ultrasonic sonar, or the GPS receiver.

This enables autonomous driving control system 102 to control the travel of vehicle 101 according to various information obtained from a camera, a LIDAR, a millimeter-wave radar, an ultrasonic sonar, and a GPS receiver.

Autonomous driving control system 102 may further include, for example, marker 105 provided on the road. This enables autonomous driving control system 102 to control the travel of vehicle 101 according to marker 105 included in autonomous driving control system 102.

Autonomous driving control system 102 may further include, for example, a plurality of markers 105 each provided on the road as marker 105. The plurality of markers 105 may emit steady magnetic fields or quasi-steady magnetic fields with a plurality of magnetic patterns for controlling the travel of vehicle 101. This enables autonomous driving control system 102 to control the travel of vehicle 101 according to a plurality of magnetic patterns.

For example, each of the plurality of magnetic patterns may be a concentric magnetic pattern. This enables autonomous driving control system 102 to inhibit the influence of the orientation of vehicle 101 in the identification of magnetic patterns.

For example, each of the plurality of magnetic patterns may be a barcode-like magnetic pattern. This enables autonomous driving control system 102 to control the travel of vehicle 101 according to a barcode that can simply indicate various information.

For example, each of the plurality of magnetic patterns may be a two-dimensional code-like magnetic pattern. This enables autonomous driving control system 102 to control the travel of vehicle 101 according to a two-dimensional code that can indicate a greater variety of information.

For example, marker 105 may represent a code sequence, as an arrangement of a plurality of magnetic poles, for controlling travel of vehicle 101. The code sequence may include a code for error detection. Information processing circuit 103 may read out the code sequence in accordance with the image showing the magnetic field.

Furthermore, information processing circuit 103 may determine whether the read-out code sequence includes an error according to the code included in the read-out code sequence. Information processing circuit 103 may control the travel of vehicle 101 in accordance with the read-out code sequence if it is determined that no error is included in the read-out code sequence.

This enables autonomous driving control system 102 to read a code sequence from marker 105 via an image indicating the magnetic field. Autonomous driving control system 102 can determine whether the read-out code sequence includes an error according to the code for error detection. Accordingly, autonomous driving control system 102 can appropriately control the travel of vehicle 101 according to a highly reliable code sequence.

For example, marker 105 may have a wire-like shape. This enables autonomous driving control system 102 to control the travel of vehicle 101 along a wire-like shape.

For example, marker 105 may be a magnetic material that is magnetic. This enables autonomous driving control system 102 to control the travel of vehicle 101 using a simple marker 105.

For example, marker 105 may be an electric conductor that is conductive. This enables autonomous driving control system 102 to appropriately control the travel of vehicle 101 using electric conductors as marker 105.

Autonomous driving control system 102 may further include, for example, induction circuit 114. Here, induction circuit 114 is equipped on vehicle 101 and induces a first magnetic field component. Marker 105 may induce a second magnetic field component in response to the first magnetic field component. This enables autonomous driving control system 102 to appropriately generate a magnetic field from marker 105 even when an electric conductor is used as marker 105.

For example, vehicle 101 according to one aspect of the present disclosure may include autonomous driving control system 102. This enables vehicle 101 to control the travel of vehicle 101 according to an image showing the magnetic field in a region closer to marker 105 than magnetic sensor array 104.

Hereinbefore, an aspect of the autonomous driving control system has been described according to an embodiment, but aspects of the autonomous driving control system are not limited to this embodiment. Any modification conceivable by those skilled in the art may be made to the embodiment, and a plurality of elements according to the embodiment may be combined arbitrarily.

For example, processing that is executed by a specific element according to the embodiment may be executed by a different element, instead of the specific element. Moreover, a sequence of a plurality of processes may be changed, or a plurality of processes may be executed in parallel. A plurality of variations may also be applied in combination. The ordinal numbers used in the description, such as first, second, etc., may be replaced as appropriate. The ordinal number may be given anew to or removed from element names, etc.

The autonomous driving control method including steps executed by each element of the autonomous driving control system may be executed by any arbitrary device or system. For example, part or all of the autonomous driving control method may be executed by a computer that includes, for example, a processor, memory, and an input/output circuit. At this time, a program for causing the computer to execute the autonomous driving control method may be executed by the computer to execute the autonomous driving control method.

The above-described program may be recorded on a non-transitory computer-readable recording medium.

Each of the elements of the autonomous driving control system may be configured in the form of dedicated hardware, in the form of general-purpose hardware that executes the above program or the like, or any combination thereof. The general-purpose hardware may be configured by, for example, memory that records the program and a general-purpose processor that reads out and executes the program from the memory. The memory as used herein may, for example, be semiconductor memory or a hard disk, and the general-purpose processor may, for example, be a CPU.

The dedicated hardware may be configured by, for example, memory and a dedicated processor. For example, a dedicated processor may refer to a memory for recording data and execute the autonomous driving control method described above.

Each element of the autonomous driving control system may be an electric circuit. These electric circuits may be configured collectively as a single electric circuit, or configured individually as different electric circuits. These electric circuits may correspond to dedicated hardware or general-purpose hardware that executes the above-described program or the like.

The autonomous driving control system can also be described as an autonomous driving control device. The autonomous driving control system may be configured from a plurality of dispersed devices.

INDUSTRIAL APPLICABILITY

One aspect of the present disclosure is useful for an autonomous driving control system of a vehicle that travels on a road provided with markers, and is applicable in, for example, traffic systems and transportation systems.

REFERENCE SIGNS LIST 101 vehicle
102 autonomous driving control system
103 information processing circuit
104 magnetic sensor array
105 marker
106 camera
107 LiDAR
108 wave sensor
109 GPS receiver
110 magnetic sensor
111 input circuit
112 arithmetic circuit
113 travel controller
114 induction circuit
115 power source
116 magnetic shield
117 protective agent

The invention claimed is:

1. An autonomous driving control system for a vehicle that travels on a road provided with a marker that emits a steady magnetic field or a quasi-steady magnetic field, the autonomous driving control system comprising:
   a magnetic sensor array that is equipped on the vehicle and senses magnetism;
   an information processing circuit that generates an image showing a magnetic field in a region closer to the marker than the magnetic sensor array, according to a sensing result of the magnetism and a fundamental equation of the steady magnetic field and the quasi-steady magnetic field, and controls travel of the vehicle according to the image;
   the marker provided on the road; and
   an induction circuit that is equipped on the vehicle and induces a first magnetic field component, wherein
   the marker is an electric conductor that is conductive and emits the steady magnetic field or the quasi-steady magnetic field by inducing a second magnetic field component in response to the first magnetic field component.

2. The autonomous driving control system according to claim 1, wherein
   the information processing circuit:
      obtains a speed of the vehicle;
      converts temporal changes in the sensing result into spatial changes according to the speed; and
      generates the image according to the fundamental equation and the sensing result in which the temporal changes have been converted into the spatial changes.

3. The autonomous driving control system according to claim 1, wherein
   the magnetic sensor array includes one or more two-dimensional magnetic sensor arrays arranged in a front-rear direction and a left-right direction of the vehicle.

4. The autonomous driving control system according to claim 1, wherein
   the magnetic sensor array includes one or more one-dimensional magnetic sensor arrays arranged in a left-right direction of the vehicle.

5. The autonomous driving control system according to claim 1, wherein the magnetic sensor array senses the magnetism in one layer arranged in a front-rear direction and a left-right direction of the vehicle.

6. The autonomous driving control system according to claim 1, wherein
   the magnetic sensor array senses the magnetism in two layers arranged in a front-rear direction and a left-right direction of the vehicle.

7. The autonomous driving control system according to claim 1, wherein
   the information processing circuit generates the image according to the following arithmetic expression which is in accordance with the sensing result and the fundamental equation:

[Math. 1]

$$H_i(x, y, z) = \frac{1}{(2\pi)^2} \int \int e^{ik_x x + ik_y y} \left\{ f(k_x, k_y) e^{z\sqrt{k_x^2+k_y^2}} \right\} dk_x dk_y$$

where: $H_i(x, y, z)$ is an i component in a magnetic field at a coordinate position $(x, y, z)$; i is x, y, or z; z is a coordinate value in a z-direction from a top of the vehicle toward a bottom of the vehicle; x is a coordinate value in an x-direction orthogonal to the z-direction, y is a coordinate value in a y-direction orthogonal to the z-direction and the x-direction, $f(k_x, k_y)$ is a two-dimensional Fourier transform image of $H_i(x, y, 0)$ indicating the sensing result at $(x, y, 0)$ which is a measurement plane; $k_x$ is a wavenumber with respect to x, and $k_y$ is a wavenumber with respect to y.

8. The autonomous driving control system according to claim 1, wherein
   the information processing circuit generates the image according to the following arithmetic expression which is in accordance with the sensing result and the fundamental equation:

[Math. 2]

$$H_i(x, y, z) =$$
$$\frac{1}{(2\pi)^2} \int \int e^{ik_x x + ik_y y} \left\{ \frac{1}{2}\left( f(k_x, k_y) + \frac{g(k_x, k_y)}{\sqrt{k_x^2 + k_y^2}} \right) e^{z\sqrt{k_x^2+k_y^2}} + \frac{1}{2}\left( f(k_x, k_y) - \frac{g(k_x, k_y)}{\sqrt{k_x^2 + k_y^2}} \right) e^{-z\sqrt{k_x^2+k_y^2}} \right\} dk_x dk_y$$

where: $H_i(x, y, z)$ is an i component in a magnetic field at a coordinate position $(x, y, z)$; i is x, y, or z; z is a coordinate value in a z-direction from a top of the vehicle toward a bottom of the vehicle; x is a coordinate value in an x-direction orthogonal to the z-direction, y is a coordinate value in a y-direction orthogonal to the z-direction and the x-direction, $f(k_x, k_y)$ is a two-dimensional Fourier transform image of $H_i(x, y, 0)$ indicating the sensing result at $(x, y, 0)$ which is a measurement plane; $g(k_x, k_y)$ is a two-dimensional Fourier transform image of $\partial/\partial z H_i(x, y, z)|_{z=0}$ indicating a gradient in the z-direction of the sensing result at $(x, y, 0)$ which is the measurement plane; $k_x$ is a wavenumber with respect to x, and $k_y$ is a wavenumber with respect to y.

9. The autonomous driving control system according to claim 1, further comprising:

at least one of a camera, a LiDAR, a millimeter-wave radar, an ultrasonic sonar, or a GPS receiver equipped on the vehicle, wherein the information processing circuit further controls the travel of the vehicle according to the at least one of the camera, the LiDAR, the millimeter-wave radar, the ultrasonic sonar, or the GPS receiver.

10. The autonomous driving control system according to claim 1, wherein the marker comprises a plurality of markers provided on the road, and the plurality of markers emit steady magnetic fields or quasi-steady magnetic fields with a plurality of magnetic patterns for controlling the travel of the vehicle.

11. The autonomous driving control system according to claim 10, wherein each of the plurality of magnetic patterns is a concentric magnetic pattern.

12. The autonomous driving control system according to claim 10, wherein each of the plurality of magnetic patterns is a barcode-like magnetic pattern.

13. The autonomous driving control system according to claim 10, wherein each of the plurality of magnetic patterns is a two-dimensional code-like magnetic pattern.

14. The autonomous driving control system according to claim 1, wherein the marker represents a code sequence, as an arrangement of a plurality of magnetic poles, for controlling the travel of the vehicle, the code sequence includes a code for error detection, and the information processing circuit:

reads the code sequence according to the image;

determines whether the code sequence read includes an error according to the code included in the code sequence read; and controls the travel of the vehicle in accordance with the code sequence read on condition that the code sequence read is determined to include no error.

15. The autonomous driving control system according to claim 1, wherein the marker has a wire-like shape.

16. An autonomous driving control method for a vehicle that travels on a road provided with a marker that emits a steady magnetic field or a quasi-steady magnetic field, the autonomous driving control method comprising:

sensing magnetism by a magnetic sensor array equipped on the vehicle;

generating an image showing a magnetic field in a region closer to the marker than the magnetic sensor array, according to a sensing result of the magnetism and a fundamental equation of the steady magnetic field and the quasi-steady magnetic field, and controlling travel of the vehicle according to the image; and inducing a first magnetic field component by an induction circuit equipped on the vehicle, wherein the marker is an electric conductor that is conductive and emits the steady magnetic field or the quasi-steady magnetic field by inducing a second magnetic field component in response to the first magnetic field component.

\* \* \* \* \*